（12） United States Patent
Kong et al.

(10) Patent No.: US 11,543,634 B2
(45) Date of Patent: Jan. 3, 2023

(54) OPTICAL IMAGING LENS GROUP

(71) Applicant: Zhejiang Sunny Optical Co., Ltd, Ningbo (CN)

(72) Inventors: Xule Kong, Ningbo (CN); Yabin Hu, Ningbo (CN); Jianke Wenren, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 340 days.

(21) Appl. No.: 16/860,251

(22) Filed: Apr. 28, 2020

(65) Prior Publication Data
US 2020/0355890 A1 Nov. 12, 2020

(30) Foreign Application Priority Data

May 8, 2019 (CN) .......................... 201910381934.7

(51) Int. Cl.
*G02B 13/02* (2006.01)
*G02B 9/64* (2006.01)
*G02B 13/00* (2006.01)

(52) U.S. Cl.
CPC .............. *G02B 13/02* (2013.01); *G02B 9/64* (2013.01); *G02B 13/0045* (2013.01)

(58) Field of Classification Search
None
See application file for complete search history.

(56) References Cited

U.S. PATENT DOCUMENTS

| 2013/0265649 | A1* | 10/2013 | Ohashi ............... G02B 15/1421 359/692 |
| 2015/0378131 | A1 | 12/2015 | Tang et al. |
| 2017/0184822 | A1* | 6/2017 | Shi ........................... G02B 9/64 |
| 2017/0227734 | A1 | 8/2017 | Huang |
| 2017/0254986 | A1 | 9/2017 | Lai et al. |
| 2017/0357081 | A1* | 12/2017 | Dai ........................ G02B 9/64 |

(Continued)

FOREIGN PATENT DOCUMENTS

| CN | 106896477 A | 6/2017 |
| CN | 107817581 A | 3/2018 |

(Continued)

OTHER PUBLICATIONS

Communication dated Aug. 16, 2021 from the Indian Intellectual Property Office in Application No. 202014017351.

*Primary Examiner* — Darryl J Collins
(74) *Attorney, Agent, or Firm* — Sughrue Mion, PLLC

(57) ABSTRACT

The present disclosure discloses an optical imaging lens group including, sequentially from an object side to an image side along an optical axis, a first lens having a positive refractive power; a second lens having a negative refractive power; a third lens having a refractive power; a fourth lens having a refractive power, and an image-side surface thereof being a concave surface; a fifth lens having a refractive power; a sixth lens having a refractive power, and an object-side surface thereof being a convex surface; and a seventh lens having a negative refractive power. A distance TTL along the optical axis from an object-side surface of the first lens of the optical imaging lens group to an imaging plane of the optical imaging lens group and a total effective focal length f of the optical imaging lens group satisfy TTL/f<1.

18 Claims, 17 Drawing Sheets

(56) References Cited

U.S. PATENT DOCUMENTS

| | | | |
|---|---|---|---|
| 2018/0074298 A1* | 3/2018 | Jung | G02B 13/0045 |
| 2018/0149837 A1* | 5/2018 | Jung | G02B 13/0045 |
| 2019/0121098 A1 | 4/2019 | Zhou et al. | |
| 2019/0121100 A1 | 4/2019 | Song et al. | |
| 2019/0258028 A1* | 8/2019 | Huang | G02B 9/64 |

FOREIGN PATENT DOCUMENTS

| | | |
|---|---|---|
| CN | 109445073 A | 3/2019 |
| CN | 109683294 A | 4/2019 |
| TW | I651565 B | 2/2019 |
| WO | 2019/052144 A1 | 3/2019 |

* cited by examiner

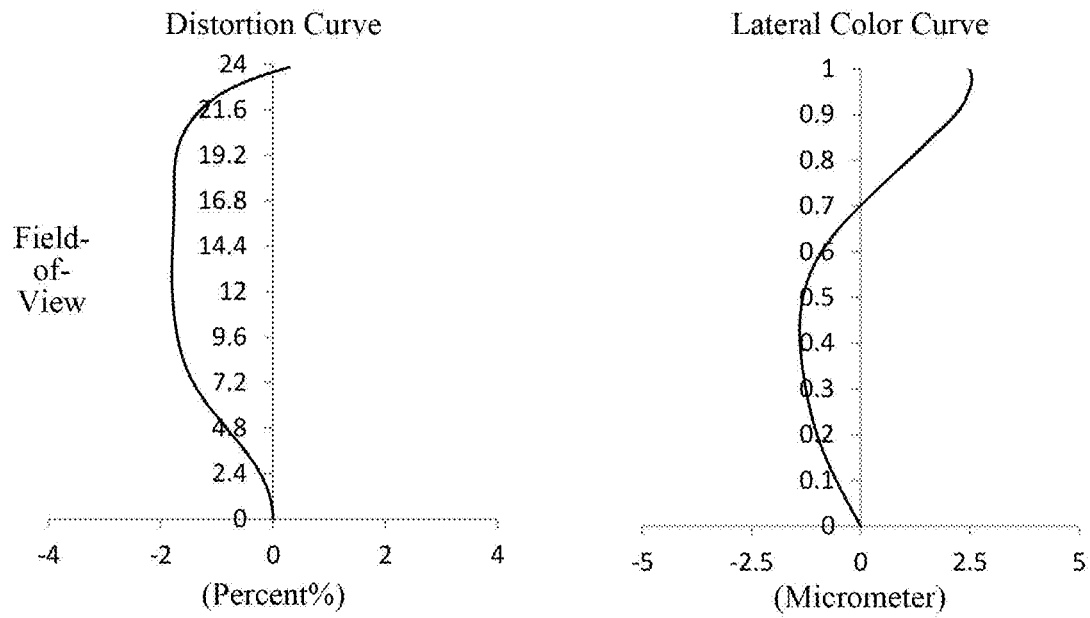
Fig. 2C
Fig. 2D
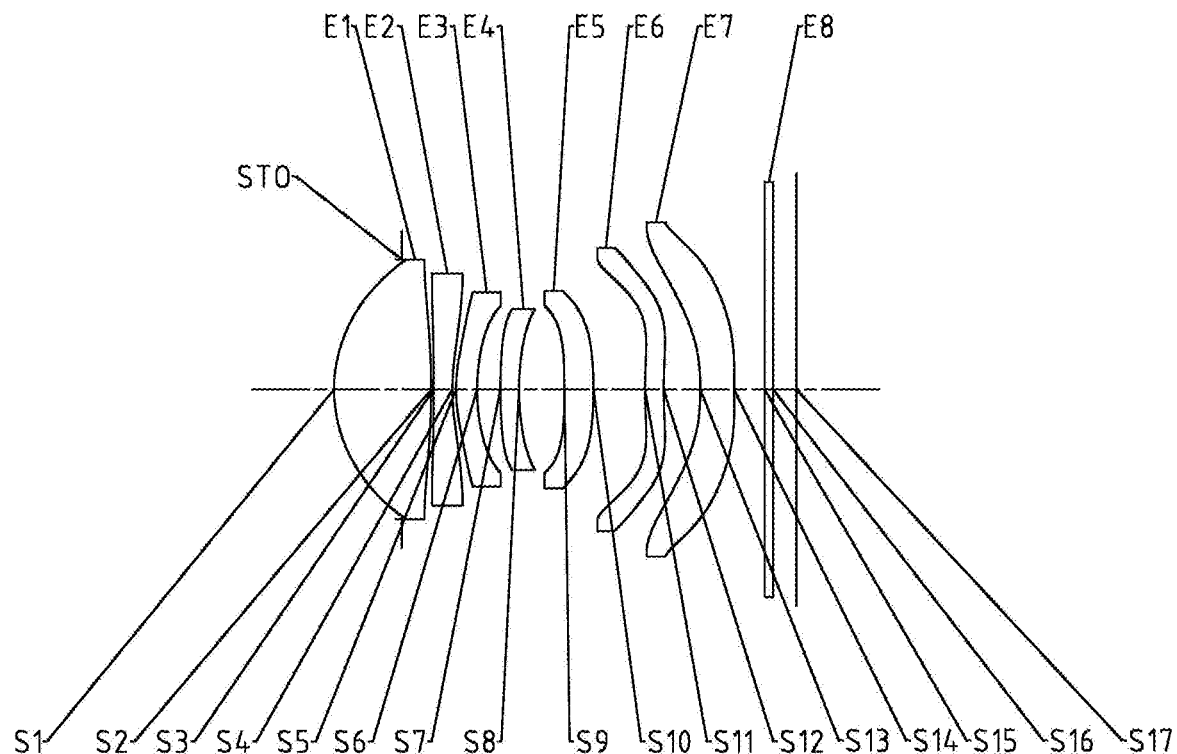
Fig. 3

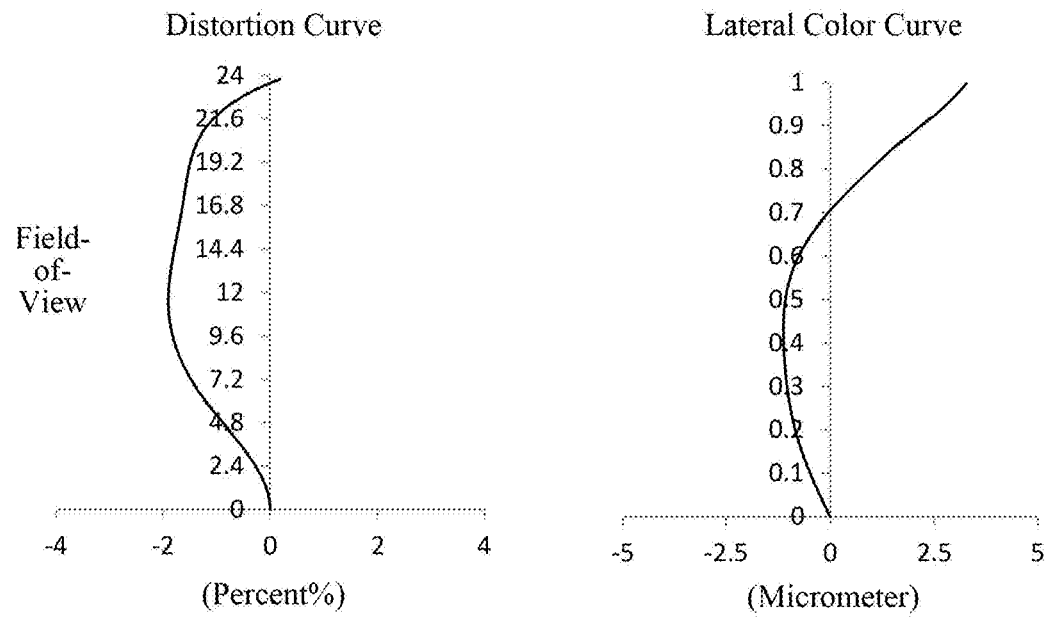
Fig. 6C
Fig. 6D
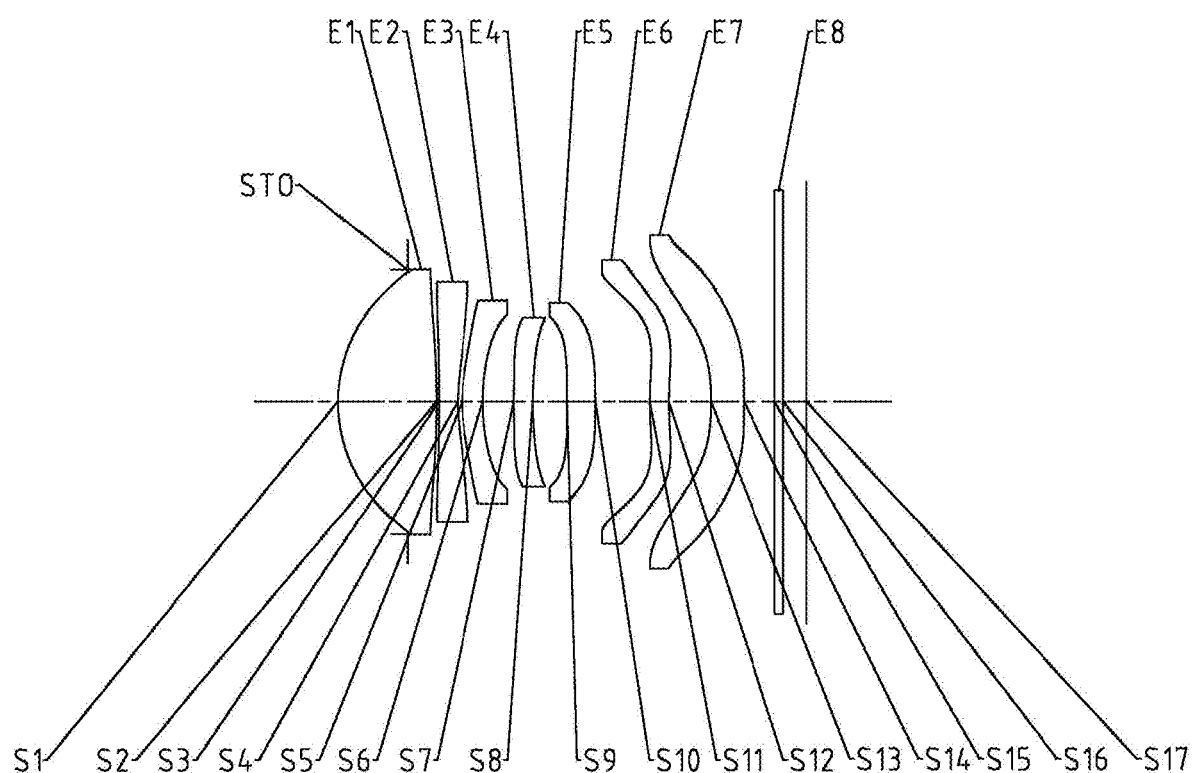
Fig. 7

OPTICAL IMAGING LENS GROUP

CROSS-REFERENCE TO RELATED APPLICATIONS

This application claims benefit of priority to Chinese Patent Application No. 201910381934.7 filed on May 8, 2019 before the China National Intellectual Property Administration, the entire disclosures of which is incorporated herein by reference in its entity.

TECHNICAL FIELD

The present disclosure relates to an optical imaging lens group, and more specifically, relates to an optical imaging lens group including seven lenses.

BACKGROUND

With the rapid development of CMOS (Complementary Metal-Oxide Semiconductor) and CCD (Charge Coupled Device) and the market guidance, small imaging lens assemblies are trending toward large aperture, large image plane and small size, making the design of small imaging lens assemblies increasingly difficult.

At present, in order to further enhance the imaging effect of portable imaging device imaging, the conventional solution of each terminal is to cutout the main body of the object through an algorithm, and then integrate the blurred background and the main body to achieve the effect of highlighting the main body. However, the disadvantage of this method is that the algorithm cutout cannot accurately locate the edges of the main body. Thus, the final imaging effect makes the transition between the main body and the background appear extremely unnatural, and the effect of optical depth of field cannot be fully achieved, which presents new challenges to optical design.

In order to improve the above-mentioned situation, optical designers need to design an optical system with a larger aperture to achieve a shallower depth of field. At the same time, the focal length may be increased to obtain a shallower depth of field. However, a larger focal length will lead to a larger optical system structure, which contradicts the portability required by the terminal device. Therefore, how to increase the focal length without changing the overall length of the optical system is a big challenge for optical design.

SUMMARY

The present disclosure provides an optical imaging lens group, for example, a telephoto optical imaging lens group, that is applicable to portable electronic products and at least solves or partially addresses at least one of the above disadvantages of the prior art.

The present disclosure provides an optical imaging lens group which includes, sequentially from an object side to an image side along an optical axis, a first lens having a positive refractive power; a second lens having a negative refractive power; a third lens having a refractive power; a fourth lens having a refractive power, and an image-side surface of the fourth lens being a concave surface; a fifth lens having a refractive power; a sixth lens having a refractive power, and an object-side surface of the sixth lens being a convex surface; and a seventh lens having a negative refractive power.

The present disclosure also provides an optical imaging lens group which includes, sequentially from an object side to an image side along an optical axis, a first lens having a positive refractive power; a second lens having a negative refractive power; a third lens having a refractive power; a fourth lens having a refractive power, and an object-side surface of the fourth lens being a convex surface; a fifth lens having a refractive power; a sixth lens having a refractive power, and an image-side surface of the sixth lens being a concave surface; and a seventh lens having a negative refractive power.

In one embodiment, a distance TTL along the optical axis from an object-side surface of the first lens of the optical imaging lens group to an imaging plane of the optical imaging lens group and a total effective focal length f of the optical imaging lens group satisfy $TTL/f<1$.

In one embodiment, a total effective focal length f of the optical imaging lens group and an entrance pupil diameter EPD of the optical imaging lens group satisfy $f/EPD<2$.

In one embodiment, a total effective focal length f of the optical imaging lens group and an effective focal length f1 of the first lens satisfy $0.3<f1/f<0.8$.

In one embodiment, an effective focal length f2 of the second lens and an effective focal length f7 of the seventh lens satisfy $0.3<f2/f7<0.8$.

In one embodiment, a radius of curvature R1 of an object-side surface of the first lens and a radius of curvature R4 of an image-side surface of the second lens satisfy $0.5<R1/R4<1$.

In one embodiment, a radius of curvature R5 of an object-side surface of the third lens and a radius of curvature R6 of an image-side surface of the third lens satisfy $0.7<R5/R6<1.2$.

In one embodiment, a radius of curvature R6 of an image-side surface of the third lens and a radius of curvature R7 of the object-side surface of the fourth lens satisfy $0.1<R6/R7<0.7$.

In one embodiment, a radius of curvature R8 of the image-side surface of the fourth lens and a total effective focal length f of the optical imaging lens group satisfy $0.3<R8/f<0.8$.

In one embodiment, a radius of curvature R10 of an image-side surface of the fifth lens and a total effective focal length f of the optical imaging lens group satisfy $-1<f/R10<0$.

In one embodiment, a radius of curvature R11 of the object-side surface of the sixth lens and a radius of curvature R12 of the image-side surface of the sixth lens satisfy $0.7<R12/R11<1.2$.

In one embodiment, a radius of curvature R13 of an object-side surface of the seventh lens and an effective focal length f7 of the seventh lens satisfy $0.5<R13/f7<1$.

In one embodiment, a combined focal length f1234 of the first lens, the second lens, the third lens, and the fourth lens and a total effective focal length f of the optical imaging lens group satisfy $0.7<f1234/f<1.2$.

In one embodiment, a total effective focal length f of the optical imaging lens group and a combined focal length f67 of the sixth lens and the seventh lens satisfy $-1<f/f67<-0.5$.

In one embodiment, a center thickness CT1 of the first lens along the optical axis, a center thickness CT2 of the second lens along the optical axis and a center thickness CT5 of the fifth lens along the optical axis satisfy $0.3<(CT2+CT5)/CT1<0.8$.

In one embodiment, a center thickness CT3 of the third lens along the optical axis, a center thickness CT4 of the fourth lens along the optical axis, an air interval T34 between the third lens and the fourth lens along the optical axis and an air interval T45 between the fourth lens and the fifth lens along the optical axis satisfy $0.3<(CT3+CT4)/(T34+T45)<0.8$.

In one embodiment, a center thickness CT6 of the sixth lens along the optical axis, a center thickness CT7 of the seventh lens along the optical axis, an air interval T56 between the fifth lens and the sixth lens along the optical axis and an air interval T67 between the sixth lens and the seventh lens along the optical axis satisfy $0.4<(CT6+CT7)/(T56+T67)<0.9$.

In one embodiment, a distance SAG61 along the optical axis from an intersection of the object-side surface of the sixth lens and the optical axis to an apex of an effective radius of the object-side surface of the sixth lens and a distance SAG72 along the optical axis from an intersection of an image-side surface of the seventh lens and the optical axis to an apex of an effective radius of the image-side surface of the seventh lens satisfy $0.5<SAG61/SAG72<1$.

The present disclosure employs seven lenses, and the optical imaging lens group has at least one advantageous effect such as telephoto, large aperture, high image quality and miniaturization and the like by rationally assigning the refractive power, the surface shape, the center thickness of each lens, and the on-axis spaced distance between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIGS. 2A to 2D illustrate a longitudinal aberration curve, an astigmatic curve, a distortion curve and a lateral color curve of the optical imaging lens group of the Example 1, respectively;

FIG. 3 illustrates a schematic structural view of an optical imaging lens group according to Example 2 of the present disclosure;

FIGS. 6A to 6D illustrate a longitudinal aberration curve, an astigmatic curve, a distortion curve and a lateral color curve of the optical imaging lens group of the Example 3, respectively;

FIG. 7 illustrates a schematic structural view of an optical imaging lens group according to Example 4 of the present disclosure;

DETAILED DESCRIPTION OF EMBODIMENTS

Figure 1:
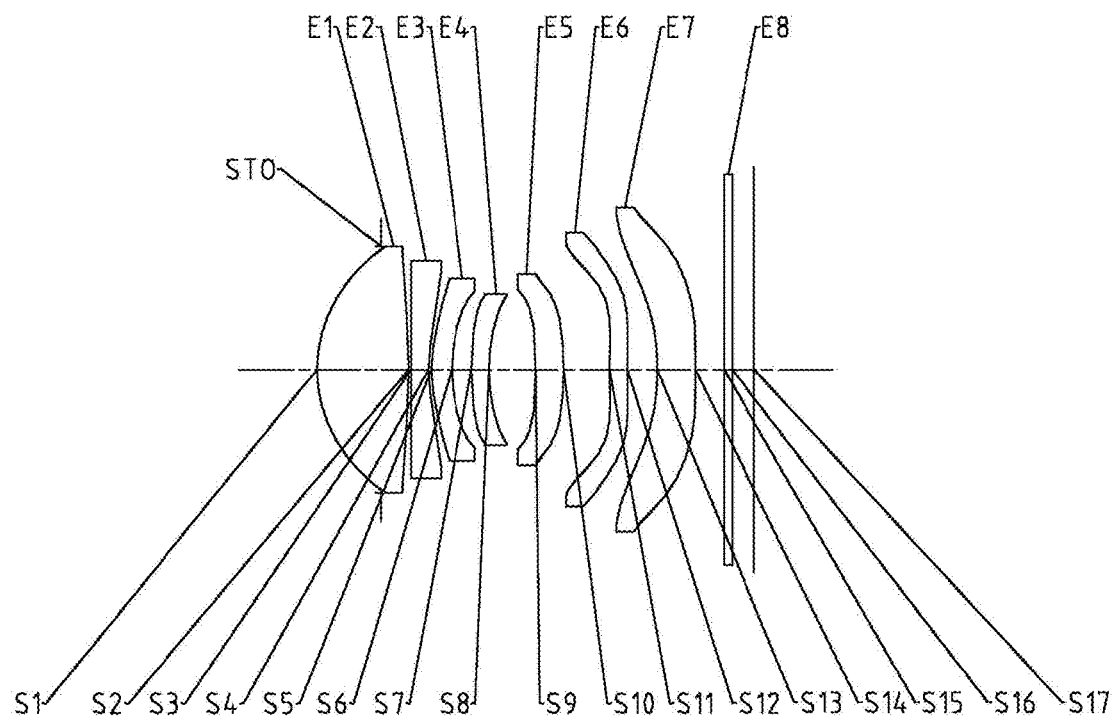
FIG. 1 illustrates a schematic structural view of an optical imaging lens group according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens group according to an exemplary embodiment of the present disclosure may include, for example, seven lenses having refractive power, i.e. a first lens, a second lens, a third lens, a fourth lens, a fifth lens, a sixth lens and a seventh lens. The seven lenses are arranged sequentially from an object side to an image side along an optical axis. Among the first to seventh lenses, there may be an air gap between each two adjacent lenses.

In an exemplary embodiment, the first lens may have a positive refractive power; the second lens may have a negative refractive power; the third lens has a positive refractive power or a negative refractive power; the fourth lens has a positive refractive power or a negative refractive power, and an image-side surface thereof may be a concave surface; the fifth lens has a positive refractive power or a negative refractive power; the sixth lens has a positive refractive power or a negative refractive power, and a object-side surface thereof may be a convex surface; and the seventh lens may have a negative refractive power. The first lens having a positive refractive power is helpful to increase the aperture of the optical imaging lens group and increase the amount of light entering. The second lens having a negative refractive power is helpful to compensate the spherical aberration produced by the first lens. The seventh lens having a negative refractive power is helpful to improve the imaging quality of the optical imaging lens group.

In an exemplary embodiment, the first lens may have a positive refractive power; the second lens may have a negative refractive power; the third lens has a positive refractive power or a negative refractive power; the fourth lens has a positive refractive power or a negative refractive power, and an object-side surface thereof may be a convex surface; the fifth lens has a positive refractive power or a negative refractive power; the sixth lens has a positive refractive power or a negative refractive power, and an image-side surface thereof may be a concave surface; and the seventh lens may have a negative refractive power. The first lens having a positive refractive power is helpful to increase the aperture of the optical imaging lens group and increase the amount of light entering. The second lens having a negative refractive power is helpful to compensate the spherical aberration produced by the first lens. The seventh lens having a negative refractive power is helpful to improve the imaging quality of the optical imaging lens group.

In an exemplary embodiment, the optical imaging lens group according to the present disclosure may satisfy TTL/f<1, where TTL is a distance along the optical axis from an object-side surface of the first lens of the optical imaging lens group to an imaging plane of the optical imaging lens group and f is a total effective focal length of the optical imaging lens group. More specifically, TTL and f may further satisfy $0.9<TTL/f<1$, for example, $0.95 \leq TTL/f \leq 0.98$. When the conditional expression TTL/f<1 is satisfied, the optical imaging lens group having a telephoto characteristic may have a relatively compact structure, and the space occupied by the optical imaging lens group may be reduced, thereby greatly improving the portability of the telephoto optical imaging lens group, and also providing more possibilities for the matching of lens modules. The optical imaging lens group according to the present disclosure may also satisfy: f/EPD<2, where f is the total effective focal length of the optical imaging lens group, and EPD is an entrance pupil diameter of the optical imaging lens group. More specifically, f and EPD may further satisfy: $1.8<f/EPD<2$, for example, $1.84 \leq f/EPD \leq 1.87$. When the conditional expression f/EPD<2 is satisfied, the amount of light entering in the optical imaging lens group may be effectively increased so as to make the captured image brighter, and the problem of the gray imaging due to poor lighting in the shooting environment may be effectively solved. At the same time, the camera lens assembly may also obtain a smaller depth of field, thereby improving the viewing of the imaged image. In addition, when the conditional expression TTL/f<1 and the conditional expression f/EPD<2 are satisfied simultaneously, the size of the telephoto optical imaging lens group may be effectively reduced, thereby making the scope of application of the lens assembly wider.

In an exemplary embodiment, the optical imaging lens group according to the present disclosure may satisfy: $0.3<f1/f<0.8$, where f is a total effective focal length of the optical imaging lens group, and f1 is an effective focal length of the first lens. More specifically, f1 and f may further satisfy $0.49 \leq f1/f \leq 0.55$. Satisfying this conditional expression helps to make the first lens have a low refractive power, which is conducive to light convergence. At the same time, when this condition expression is satisfied, the contribution of other lenses to light convergence is relatively small, which is conducive to reducing the sensitivity during processing.

In an exemplary embodiment, the optical imaging lens group according to the present disclosure may satisfy: $0.3 < f2/f7 < 0.8$, where f2 is an effective focal length of the second lens, and f7 is an effective focal length of the seventh lens. More specifically, f2 and f7 may further satisfy $0.43 \leq f2/f7 \leq 0.67$. Satisfying the conditional expression $0.3 < f2/f7 < 0.8$ is beneficial to reduce the total track length of the telephoto lens group.

In an exemplary embodiment, the optical imaging lens group according to the present disclosure may satisfy: $0.7 < f1234/f < 1.2$, where f1234 is a combined focal length of the first lens, the second lens, the third lens, and the fourth lens and f is a total effective focal length of the optical imaging lens group. More specifically, f1234 and f may further satisfy $0.90 \leq f1234/f \leq 1.06$. When the conditional expression $0.7 < f1234/f < 1.2$ is satisfied, the air gap between adjacent lenses may be effectively reduced, and the total track length of the telephoto lens group may be advantageously reduced.

In an exemplary embodiment, the optical imaging lens group according to the present disclosure may satisfy $-1 < f/f67 < -0.5$, where f is a total effective focal length of the optical imaging lens group, and f67 is a combined focal length of the sixth lens and the seventh lens. More specifically, f and f67 may further satisfy $-0.99 \leq f/f67 \leq -0.75$. When the conditional expression $-1 < f/f67 < -0.5$ is satisfied, the spherical aberration and chromatic aberration of the optical imaging lens group are advantageously compensated.

In an exemplary embodiment, the optical imaging lens group according to the present disclosure may satisfy $0.5 < R1/R4 < 1$, where R1 is a radius of curvature of an object-side surface of the first lens, and R4 is a radius of curvature of an image-side surface of the second lens. More specifically, R1 and R4 may further satisfy $0.58 \leq R1/R4 \leq 0.85$. When the conditional expression $0.5 < R1/R4 < 1$ is satisfied, the image-side surface of the second lens may effectively compensate the spherical aberration, chromatic aberration, and field curvature generated by the object-side surface of the first lens, thereby helping to correct the aberration of the entire optical imaging lens group. Optionally, the object-side surface of the first lens may be a convex surface, and the image-side surface of the second lens may be a concave surface.

In an exemplary embodiment, the optical imaging lens group according to the present disclosure may satisfy $0.7 < R5/R6 < 1.2$, where R5 is a radius of curvature of an object-side surface of the third lens, and R6 is a radius of curvature of an image-side surface of the third lens. More specifically, R5 and R6 may further satisfy $0.78 \leq R5/R6 \leq 1.09$. When the conditional expression $0.7 < R5/R6 < 1.2$ is satisfied, the refractive power of the third lens is advantageously controlled, and the aberration of the optical imaging lens group may be corrected by the third lens having a controlled refractive power. Optionally, the object-side surface of the third lens may be a convex surface, and the image-side surface of the third lens may be a concave surface.

In an exemplary embodiment, the optical imaging lens group according to the present disclosure may satisfy $0.1 < R6/R7 < 0.7$, where R6 is a radius of curvature of an image-side surface of the third lens, and R7 is a radius of curvature of the object-side surface of the fourth lens. More specifically, R6 and R7 may further satisfy: $0.19 \leq R6/R7 \leq 0.63$. Satisfying the conditional expression $0.1 < R6/R7 < 0.7$ helps to control the third lens and the fourth lens to have a positive refractive power and a negative refractive power respectively, so that the spherical aberration and chromatic aberration may be effectively eliminated by the combination of the positive lens and the negative lens.

In an exemplary embodiment, the optical imaging lens group according to the present disclosure may satisfy: $0.3 < R8/f < 0.8$, where R8 is a radius of curvature of the image-side surface of the fourth lens, and f is a total effective focal length of the optical imaging lens group. More specifically, R8 and f may further satisfy: $0.40 \leq R8/f \leq 0.72$. Satisfying the conditional expression of $0.3 < R8/f < 0.8$ helps to improve the processability of the fourth lens, and avoids processing difficulties caused by the excessively large radius of curvature of the image-side surface of the fourth lens.

In an exemplary embodiment, the optical imaging lens group according to the present disclosure may satisfy $-1 < f/R10 < 0$, where R10 is a radius of curvature of an image-side surface of the fifth lens, and f is a total effective focal length of the optical imaging lens group. More specifically, f and R10 may further satisfy: $-0.94 \leq f/R10 \leq -0.10$. Satisfying the conditional expression $-1 < f/R10 < 0$ may effectively reduce the inclination angle of the image-side surface shape of the fifth lens, which is beneficial to the processing and molding of the fifth lens. Optionally, the image-side surface of the fifth lens may be a convex surface.

In an exemplary embodiment, the optical imaging lens group according to the present disclosure may satisfy: $0.7 < R12/R11 < 1.2$, where R11 is a radius of curvature of the object-side surface of the sixth lens, and R12 is a radius of curvature of the image-side surface of the sixth lens. More specifically, R12 and R11 may further satisfy: $0.82 \leq R12/R11 \leq 1.00$. Satisfying the conditional expression $0.7 < R12/R11 < 1.2$ helps to control the refractive power of the sixth lens, and is beneficial to compensating the aberrations of the optical imaging lens group.

In an exemplary embodiment, the optical imaging lens group according to the present disclosure may satisfy $0.5 < R13/f7 < 1$, where R13 is a radius of curvature of an object-side surface of the seventh lens, and f7 is an effective focal length of the seventh lens. More specifically, R13 and f7 may further satisfy $0.53 \leq R13/f7 \leq 0.96$. Satisfying the conditional expression $0.5 < R13/f7 < 1$ helps to control the surface shape of the seventh lens, and is beneficial to compensating the aberrations generated by the first lens to the sixth lens. Optionally, the object-side surface of the seventh lens may be a concave surface.

In an exemplary embodiment, the optical imaging lens group according to the present disclosure may satisfy: $0.3 < (CT2+CT5)/CT1 < 0.8$, where CT1 is a center thickness of the first lens along the optical axis, CT2 is a center thickness of the second lens along the optical axis, and CT5 is a center thickness of the fifth lens along the optical axis. More specifically, CT2, CT5 and CT1 may further satisfy: $0.4 < (CT2+CT5)/CT1 < 0.6$, for example, $0.48 \leq (CT2+CT5)/CT1 \leq 0.52$. When the conditional expression $0.3 < (CT2+CT5)/CT1 < 0.8$ is satisfied, the total track length of the optical imaging lens group may be effectively reduced, which is beneficial to the assembly of the optical imaging lens group.

In an exemplary embodiment, the optical imaging lens group according to the present disclosure may satisfy: $0.3 < (CT3+CT4)/(T34+T45) < 0.8$, where CT3 is a center thickness of the third lens along the optical axis, CT4 is a center thickness of the fourth lens along the optical axis, T34 is an air interval between the third lens and the fourth lens along the optical axis, and T45 is an air interval between the fourth lens and the fifth lens along the optical axis. More specifically, CT3, CT4, T34 and T45 may further satisfy: $0.55 \leq (CT3+CT4)/(T34+T45) \leq 0.61$. When the conditional expression $0.3 < (CT3+CT4)/(T34+T45) < 0.8$ is satisfied, the center thicknesses of the third lens and the fourth lens and the air intervals between the third lens and the fourth lens and between the fourth lens and the fifth lens may be effectively reduced, the total track length of the entire optical imaging lens group is advantageously reduced and the structure is more compact.

In an exemplary embodiment, the optical imaging lens group according to the present disclosure may satisfy 0.4<(CT6+CT7)/(T56+T67)<0.9, where CT6 is a center thickness of the sixth lens along the optical axis, CT7 is a center thickness of the seventh lens along the optical axis, T56 is an air interval between the fifth lens and the sixth lens along the optical axis, and T67 is an air interval between the sixth lens and the seventh lens along the optical axis. More specifically, CT6, CT7, T56 and T67 may further satisfy: 0.50≤(CT6+CT7)/(T56+T67)≤0.76. When the conditional expression 0.4<(CT6+CT7)/(T56+T67)<0.9 is satisfied, the uniformity of the air interval between adjacent lenses is advantageously controlled, the interval between the lenses is more reasonable, which is beneficial to the assembly of the optical imaging lens group.

In an exemplary embodiment, the optical imaging lens group according to the present disclosure may satisfy: 0.5<SAG61/SAG72<1, where SAG61 is a distance along the optical axis from an intersection of the object-side surface of the sixth lens and the optical axis to an apex of an effective radius of the object-side surface of the sixth lens, and SAG72 is a distance along the optical axis from an intersection of an image-side surface of the seventh lens and the optical axis to an apex of an effective radius of the image-side surface of the seventh lens. More specifically, SAG61 and SAG72 may further satisfy: 0.5<SAG61/SAG72<0.8, for example, 0.62≤SAG61/SAG72≤0.71. When the conditional expression 0.5<SAG61/SAG72<1 is satisfied, the inclination angles at the lens edges of the sixth lens and seventh lens may be effectively controlled, and the lens surface may be smoothly transitioned, the sensitivity of the lens in the processing process is advantageously reduced, and the processing difficulty of the lens in the processing process may be reduced.

In an exemplary embodiment, the optical imaging lens group described above may further include at least one stop. The stop may be disposed at an appropriate position as needed, for example, between the object side and the first lens. Optionally, the above optical imaging lens group may further include an optical filter for correcting the color deviation and/or a protective glass for protecting the photosensitive element on the imaging plane.

The optical imaging lens group according to the above embodiments of the present disclosure may employ a plurality of lenses, such as seven lenses as described above. By properly assigning the refractive power of each lens, the surface shape, the center thickness of each lens, and spaced distances on the optical axis between the lenses, the size and the sensitivity of the imaging lens assembly may be effectively reduced, and the workability of the imaging lens assembly may be improved, such that the optical imaging lens group is more advantageous for production processing and may be applied to portable electronic products. The present disclosure proposes a solution for a seven-piece imaging lens group. The lens group has the characteristics of telephoto, large aperture, high imaging quality, and miniaturization, which may match higher pixel sensors and better image processing technology.

In the embodiments of the present disclosure, at least one of the surfaces of each lens is aspheric, that is, at least one of the object-side surface and the image-side surface of each of the first lens, the second lens, the third lens, the fourth lens, the fifth lens, the sixth lens, and the seventh lens is an aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens, the sixth lens, and the seventh lens are aspheric.

However, it will be understood by those skilled in the art that the number of lenses constituting the optical imaging lens group may be varied to achieve the various results and advantages described in this specification without departing from the technical solution claimed by the present disclosure. For example, although the embodiment is described by taking seven lenses as an example, the optical imaging lens group is not limited to include seven lenses. The optical imaging lens group may also include other numbers of lenses if desired.

Some specific examples of an optical imaging lens group applicable to the above embodiments will be further described below with reference to the accompanying drawings.

Example 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 1 shows a basic parameter table of the optical imaging lens group in example 1, wherein the units for the radius of curvature, the thickness, and the focal length are millimeter (mm).

TABLE 1

Example 1: f = 6.24 mm, TTL = 5.95 mm, ImgH = 2.75 mm, Semi-FOV = 23.8°

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.8716 | | | | |
| S1 | aspheric | 1.8907 | 1.2462 | 1.55 | 56.1 | 3.05 | −0.0033 |
| S2 | aspheric | −10.8545 | 0.0300 | | | | −2.2739 |
| S3 | aspheric | 44.8167 | 0.2400 | 1.67 | 20.4 | −3.76 | 53.8670 |
| S4 | aspheric | 2.3644 | 0.0381 | | | | 0.0254 |
| S5 | aspheric | 1.9028 | 0.2815 | 1.65 | 23.5 | 11.04 | −0.0184 |
| S6 | aspheric | 2.4481 | 0.2680 | | | | −0.4496 |
| S7 | aspheric | 4.2585 | 0.2400 | 1.55 | 56.1 | −11.59 | 0.3413 |
| S8 | aspheric | 2.4948 | 0.6332 | | | | 0.1263 |
| S9 | aspheric | −12.8565 | 0.3796 | 1.67 | 20.4 | 22.74 | 77.0426 |
| S10 | aspheric | −7.0347 | 0.6239 | | | | 9.8551 |
| S11 | aspheric | 8.3459 | 0.2412 | 1.55 | 56.1 | 2324.89 | −99.0000 |
| S12 | aspheric | 8.3154 | 0.4068 | | | | −50.0326 |
| S13 | aspheric | −6.5034 | 0.5182 | 1.54 | 55.9 | −6.78 | 2.8659 |
| S14 | aspheric | 8.4931 | 0.3936 | | | | 4.7620 |
| S15 | spherical | infinite | 0.1100 | 1.52 | 64.2 | | |
| S16 | spherical | infinite | 0.2997 | | | | |
| S17 | spherical | infinite | | | | | |

Where, f is a total effective focal length of the optical imaging lens group, TTL is a distance along the optical axis from the object-side surface S1 of the first lens E1 to the imaging plane S17 of the optical imaging lens group, ImgH is half of a diagonal length of an effective pixel area on the imaging plane S17, and Semi-FOV is half of a maximal field-of-view of the optical imaging lens group.

In example 1, the object-side surface and the image-side surface of any one of the first lens E1 to the seventh lens E7 are aspheric, and the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14, A16, A18 and A20 applicable to each aspheric surface S1–S14 in example 1.

TABLE 2

| Surface number | A4 | A6 | A8 | A10 | A12 | A14 | A16 | A18 | A20 |
|---|---|---|---|---|---|---|---|---|---|
| S1 | −2.3430E−03 | −3.4694E−03 | 5.8049E−03 | −8.1934E−03 | 6.7740E−03 | −3.5659E−03 | 1.1431E−03 | −2.0831E−04 | 1.6444E−05 |
| S2 | −2.1309E−02 | 3.3038E−02 | −2.0251E−02 | 1.0697E−02 | −7.6950E−03 | 5.1936E−03 | −2.2100E−03 | 5.0627E−04 | −4.7962E−05 |
| S3 | −3.3838E−02 | 2.6692E−02 | −1.1989E−02 | 1.3283E−02 | −1.8372E−02 | 1.5282E−02 | −7.1979E−03 | 1.8019E−03 | −1.8846E−04 |
| S4 | −1.5090E−01 | 7.4689E−02 | −4.8330E−02 | 6.2449E−02 | −8.5018E−02 | 8.1350E−02 | −4.6697E−02 | 1.4349E−02 | −1.8359E−03 |
| S5 | −1.6091E−01 | 4.1931E−02 | 3.0052E−02 | 7.0420E−03 | −1.0562E−01 | 1.3367E−01 | −7.5323E−02 | 2.0643E−02 | −2.2988E−03 |
| S6 | −4.0676E−03 | 1.4239E−02 | −9.0999E−02 | 7.2766E−01 | −1.7488E+00 | 2.3257E+00 | −1.8416E+00 | 8.2145E−01 | −1.5817E−01 |
| S7 | −1.9321E−02 | 4.9317E−03 | 2.7873E−01 | −6.9008E−01 | 1.2079E+00 | −1.4377E+00 | 1.0657E+00 | −4.3428E−01 | 7.3949E−02 |
| S8 | −4.4478E−02 | 1.0654E−01 | −2.9272E−01 | 1.1098E+00 | −2.5149E+00 | 3.4880E+00 | −2.9222E+00 | 1.3633E+00 | −2.6981E−01 |
| S9 | −8.4495E−02 | −7.8299E−02 | 2.4916E−01 | −6.4174E−01 | 1.0322E+00 | −1.0598E+00 | 6.7231E−01 | −2.5198E−01 | 4.5064E−02 |
| S10 | −8.4834E−02 | 1.3136E−02 | −7.9321E−02 | 1.8367E−01 | −2.4405E−01 | 1.9724E−01 | −9.5468E−02 | 2.4079E−02 | −2.0513E−03 |
| S11 | −1.0298E−01 | −1.2021E−02 | 8.7077E−02 | −2.7624E−01 | 3.3180E−01 | −2.0029E−01 | 6.5994E−02 | −1.1336E−02 | 7.9442E−04 |
| S12 | −1.6274E−01 | 1.8892E−01 | −2.1715E−01 | 1.0498E−01 | −4.1491E−03 | −1.5221E−02 | 6.1296E−03 | −1.0031E−03 | 6.2289E−05 |
| S13 | −2.9039E−01 | 4.2708E−01 | −3.7294E−01 | 2.0809E−01 | −7.5649E−02 | 1.8040E−02 | −2.7516E−03 | 2.4593E−04 | −9.8668E−06 |
| S14 | −2.9371E−01 | 3.2295E−01 | −2.6711E−01 | 1.5541E−01 | −6.2223E−02 | 1.6529E−02 | −2.7625E−03 | 2.6203E−04 | −1.0719E−05 |

Figures 2A, 2B:
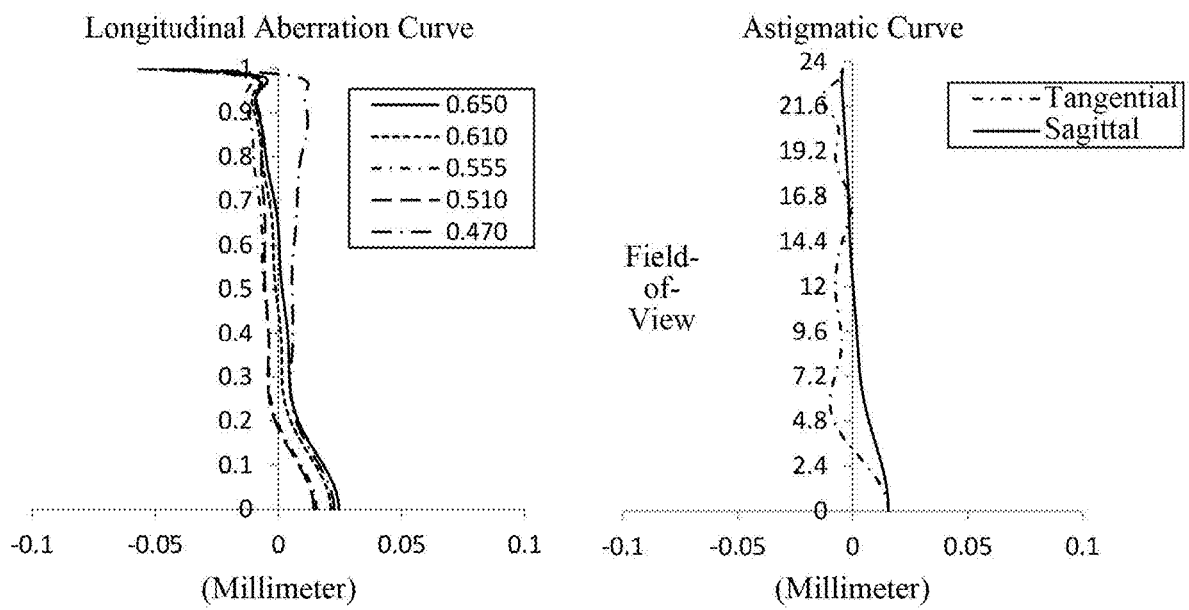

FIG. 2A illustrates a longitudinal aberration curve of the optical imaging lens group according to example 1, representing deviations of focal points converged by light of different wavelengths after passing through the lens assembly. FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion at different field-of-views. FIG. 2D illustrates a lateral color curve of the optical imaging lens group according to example 1, representing deviations of different image heights on an imaging plane after light passes through the lens assembly. It can be seen from FIG. 2A to FIG. 2D that the optical imaging lens group provided in example 1 may achieve good image quality.

Example 2

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 is a schematic structural view of the optical imaging lens group according to example 2 of the present disclosure.

As shown in FIG. 3, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 3 shows a basic parameter table of the optical imaging lens group in example 2, wherein the units for the radius of curvature, the thickness, and the focal length are millimeter (mm). Table 4 shows high-order coefficients applicable to each aspheric surface in example 2, wherein the surface shape of each aspheric surface may be defined by the formula (1) given in the above example 1.

TABLE 3

Example 2: f = 6.23 mm, TTL = 5.95 mm, ImgH = 2.75 mm, Semi-FOV = 23.8°

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.8738 | | | | |
| S1 | aspheric | 1.8886 | 1.2518 | 1.55 | 56.1 | 3.03 | −0.0036 |
| S2 | aspheric | −10.1371 | 0.0300 | | | | −5.1147 |
| S3 | aspheric | −92445.2045 | 0.2400 | 1.67 | 20.4 | −3.84 | −99.0000 |
| S4 | aspheric | 2.5581 | 0.0485 | | | | 0.0036 |
| S5 | aspheric | 2.0388 | 0.2708 | 1.65 | 23.5 | 12.51 | −0.0135 |
| S6 | aspheric | 2.5883 | 0.2986 | | | | −0.6953 |
| S7 | aspheric | 6.3173 | 0.2400 | 1.55 | 56.1 | −11.78 | −0.2473 |
| S8 | aspheric | 3.1440 | 0.5856 | | | | −0.0248 |
| S9 | aspheric | −11.9397 | 0.3735 | 1.67 | 20.4 | 22.03 | 98.9360 |
| S10 | aspheric | −6.6635 | 0.6621 | | | | 11.1303 |
| S11 | aspheric | 4.5415 | 0.2400 | 1.55 | 56.1 | −247.95 | −86.1959 |
| S12 | aspheric | 4.3121 | 0.4732 | | | | −99.0000 |
| S13 | aspheric | −5.0499 | 0.4349 | 1.54 | 55.9 | −6.89 | 2.5082 |
| S14 | aspheric | 14.2492 | 0.3924 | | | | 19.4178 |
| S15 | spherical | infinite | 0.1100 | 1.52 | 64.2 | | |
| S16 | spherical | infinite | 0.2985 | | | | |
| S17 | spherical | infinite | | | | | |

TABLE 4

| Surface number | A4 | A6 | A8 | A10 | A12 | A14 | A16 | A18 | A20 |
|---|---|---|---|---|---|---|---|---|---|
| S1 | −2.1474E−03 | −4.2765E−03 | 8.7403E−03 | −1.3742E−02 | 1.2830E−02 | −7.5157E−03 | 2.6634E−03 | −5.2609E−04 | 4.4114E−05 |
| S2 | −2.1614E−02 | 4.4036E−02 | −4.9799E−02 | 5.0119E−02 | −3.8940E−02 | 2.0643E−02 | −6.9196E−03 | 1.3190E−03 | −1.0858E−04 |
| S3 | −4.3271E−02 | 6.7440E−02 | −9.3394E−02 | 1.0828E−01 | −8.6601E−02 | 4.5344E−02 | −1.4967E−02 | 2.8493E−03 | −2.4082E−04 |

TABLE 4-continued

| Surface number | A4 | A6 | A8 | A10 | A12 | A14 | A16 | A18 | A20 |
|---|---|---|---|---|---|---|---|---|---|
| S4 | −1.6485E−01 | 1.6213E−01 | −2.9035E−01 | 4.1668E−01 | −3.6689E−01 | 1.8964E−01 | −5.2819E−02 | 6.0218E−03 | 2.8015E−05 |
| S5 | −1.6533E−01 | 9.2239E−02 | −1.2856E−01 | 1.7670E−01 | −3.4628E−02 | −1.7597E−01 | 1.9738E−01 | −8.4859E−02 | 1.3385E−02 |
| S6 | −5.7568E−03 | 6.8302E−03 | −6.0757E−02 | 5.5324E−01 | −1.2803E+00 | 1.7474E+00 | −1.5018E+00 | 7.4084E−01 | −1.5673E−01 |
| S7 | −2.0405E−02 | 3.0747E−02 | 1.0057E−01 | −1.2983E−01 | 1.4415E−01 | −1.2799E−01 | 4.9483E−02 | 1.1901E−02 | −9.6639E−03 |
| S8 | −4.0310E−02 | 1.0154E−01 | −2.9172E−01 | 1.0693E+00 | −2.3154E+00 | 3.0647E+00 | −2.4550E+00 | 1.0905E+00 | −2.0304E−01 |
| S9 | −8.8043E−02 | −1.4510E−01 | 7.7690E−01 | −2.7398E+00 | 5.9403E+00 | −8.0891E+00 | 6.7262E+00 | −3.1339E+00 | 6.2683E−01 |
| S10 | −9.4998E−02 | 1.0746E−03 | 5.5237E−02 | −2.5265E−01 | 5.3790E−01 | −6.5260E−01 | 4.6069E−01 | −1.7828E−01 | 2.9455E−02 |
| S11 | −9.9763E−02 | 3.3639E−03 | −4.8530E−02 | 1.1823E−02 | 1.6317E−02 | −2.9988E−03 | −4.9611E−03 | 2.3287E−03 | −2.9709E−04 |
| S12 | −1.1715E−01 | 8.7008E−02 | −1.3078E−01 | 8.9851E−02 | −3.6624E−02 | 1.2382E−02 | −3.4659E−03 | 5.8958E−04 | −4.1505E−05 |
| S13 | −3.4296E−01 | 4.9516E−01 | −4.1826E−01 | 2.3014E−01 | −8.5843E−02 | 2.1906E−02 | −3.6850E−03 | 3.6781E−04 | −1.6422E−05 |
| S14 | −3.3978E−01 | 3.8925E−01 | −3.1796E−01 | 1.8504E−01 | −7.5475E−02 | 2.0669E−02 | −3.5872E−03 | 3.5491E−04 | −1.5173E−05 |

Figure 4A:
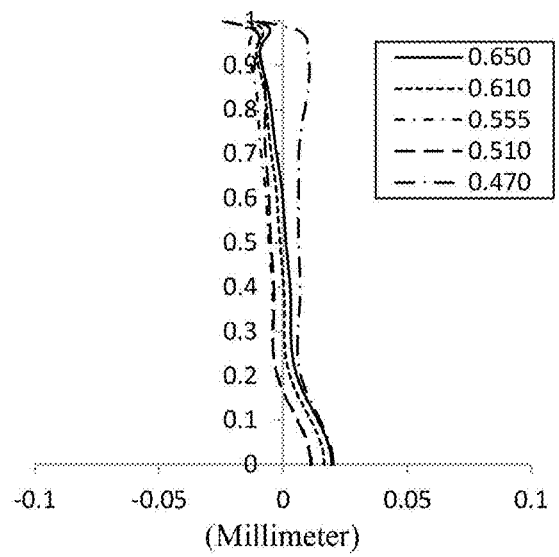
FIGS. 4A to 4D illustrate a longitudinal aberration curve, an astigmatic curve, a distortion curve and a lateral color curve of the optical imaging lens group of the Example 2, respectively.
Figure 4B:
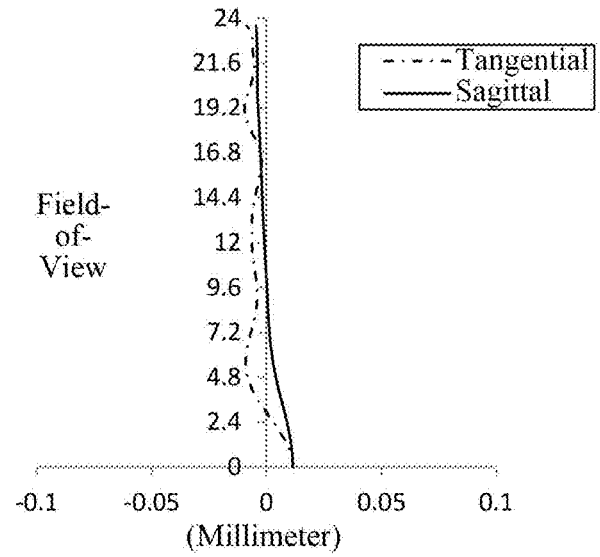
Figure 4C:
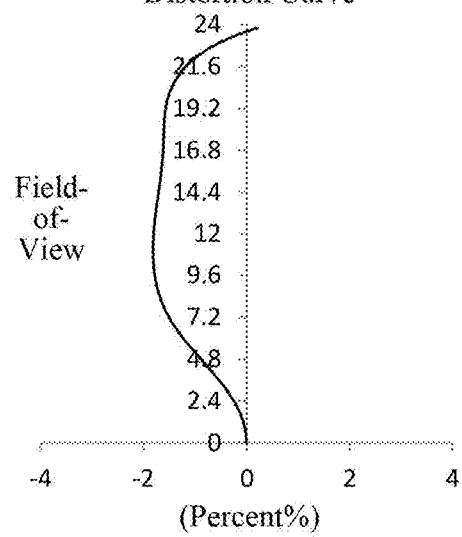
Figure 4D:
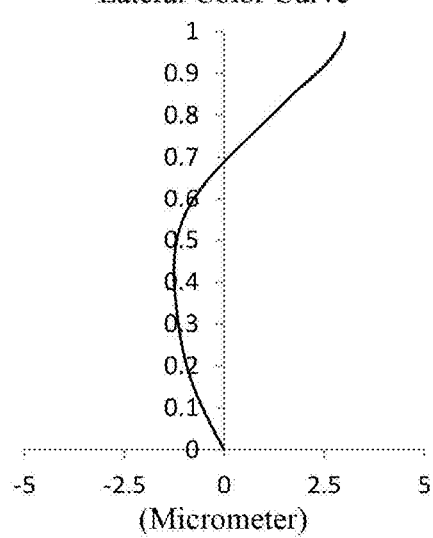

FIG. 4A illustrates a longitudinal aberration curve of the optical imaging lens group according to example 2, representing deviations of focal points converged by light of different wavelengths after passing through the lens assembly. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion at different field-of-views. FIG. 4D illustrates a lateral color curve of the optical imaging lens group according to example 2, representing deviations of different image heights on an imaging plane after light passes through the lens assembly. It can be seen from FIG. 4A to FIG. 4D that the optical imaging lens group provided in example 2 may achieve good image quality.

Example 3

Figure 5:
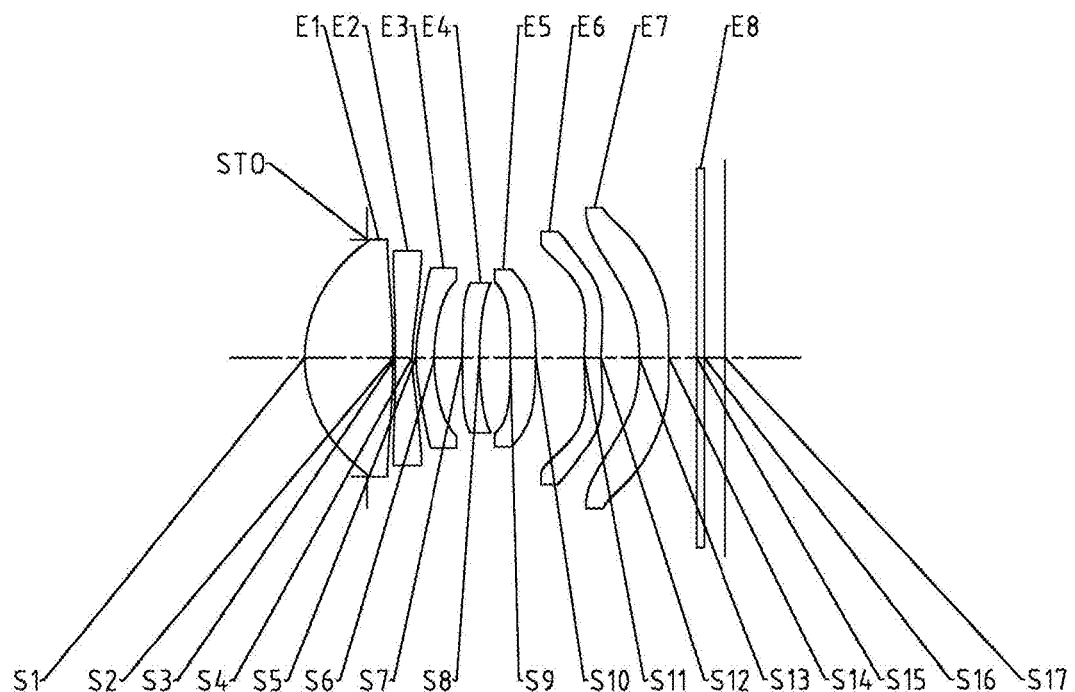
FIG. 5 illustrates a schematic structural view of an optical imaging lens group according to Example 3 of the present disclosure.

An optical imaging lens group according to example 3 of the present disclosure is described below with reference to FIG. 5 to FIG. 6D. FIG. 5 is a schematic structural view of the optical imaging lens group according to example 3 of the present disclosure.

As shown in FIG. 5, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 5 shows a basic parameter table of the optical imaging lens group in example 3, wherein the units for the radius of curvature, the thickness, and the focal length are millimeter (mm). Table 6 shows high-order coefficients applicable to each aspheric surface in example 3, wherein the surface shape of each aspheric surface may be defined by the formula (1) given in the above example 1.

TABLE 5

Example 3: f = 6.24 mm, TTL = 5.95 mm, ImgH = 2.75 mm, Semi-FOV = 23.8°

| Surface number | Surface type | Radius of curvature | Thickness | Material Refractive index | Material Abbe number | Focal length | Conic coefficient |
|---|---|---|---|---|---|---|---|
| OBJ | spherical | infinite | infinite | | | | |
| STO | spherical | infinite | −0.8777 | | | | |
| S1 | aspheric | 1.8810 | 1.2487 | 1.55 | 56.1 | 3.05 | −0.0053 |
| S2 | aspheric | −11.0386 | 0.0300 | | | | −3.8880 |
| S3 | aspheric | −192.5649 | 0.2400 | 1.67 | 20.4 | −3.86 | −99.0000 |
| S4 | aspheric | 2.6064 | 0.0525 | | | | 0.0446 |
| S5 | aspheric | 2.0920 | 0.2655 | 1.65 | 23.5 | 13.23 | 0.0055 |
| S6 | aspheric | 2.6358 | 0.3979 | | | | −0.9357 |
| S7 | aspheric | 13.7865 | 0.2400 | 1.55 | 56.1 | −11.31 | −5.0656 |
| S8 | aspheric | 4.2393 | 0.4360 | | | | −1.3453 |
| S9 | aspheric | 1428.6226 | 0.3611 | 1.67 | 20.4 | 17.32 | −99.0000 |
| S10 | aspheric | −11.6243 | 0.6825 | | | | 38.7387 |
| S11 | aspheric | 4.2837 | 0.2400 | 1.55 | 56.1 | −75.08 | −72.9014 |

TABLE 5-continued

Example 3: f = 6.24 mm, TTL = 5.95 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| S12 | aspheric | 3.8016 | 0.5379 | | | | −97.0044 |
| S13 | aspheric | −4.6475 | 0.4176 | 1.54 | 55.9 | −7.31 | 2.5750 |
| S14 | aspheric | 25.9960 | 0.3921 | | | | 53.4826 |
| S15 | spherical | infinite | 0.1100 | 1.52 | 64.2 | | |
| S16 | spherical | infinite | 0.2982 | | | | |
| S17 | spherical | infinite | | | | | |

TABLE 6

| Surface number | A4 | A6 | A8 | A10 | A12 | A14 | A16 | A18 | A20 |
|---|---|---|---|---|---|---|---|---|---|
| S1 | −2.2182E−03 | −3.4003E−03 | 6.7692E−03 | −1.0752E−02 | 1.0050E−02 | −5.8682E−03 | 2.0567E−03 | −3.9941E−04 | 3.2584E−05 |
| S2 | −2.0453E−02 | 3.4110E−02 | −1.4404E−02 | −1.4110E−02 | 2.7124E−02 | −1.9957E−02 | 7.9222E−03 | −1.6672E−03 | 1.4643E−04 |
| S3 | −4.2262E−02 | 5.0898E−02 | −2.8622E−02 | −1.5703E−02 | 4.8686E−02 | −4.3157E−02 | 1.9529E−02 | −4.5598E−03 | 4.3600E−04 |
| S4 | −1.6583E−01 | 1.6043E−01 | −2.5720E−01 | 2.9242E−01 | −1.5056E−01 | −1.3425E−02 | 5.3502E−02 | −2.3278E−02 | 3.3471E−03 |
| S5 | −1.7171E−01 | 1.2855E−01 | −1.8111E−01 | 1.5156E−01 | 1.2687E−01 | −3.7405E−01 | 3.1056E−01 | −1.1563E−01 | 1.6477E−02 |
| S6 | −1.4341E−02 | 5.9291E−02 | −1.7680E−01 | 7.0261E−01 | −1.4553E+00 | 1.9388E+00 | −1.6482E+00 | 7.9829E−01 | −1.6419E−01 |
| S7 | −3.2574E−02 | 6.3471E−02 | 1.4309E−01 | −4.6019E−01 | 8.7520E−01 | −1.0278E+00 | 7.0357E−01 | −2.5304E−01 | 3.6969E−02 |
| S8 | −5.8853E−02 | 1.0474E−01 | −8.2533E−02 | 2.0809E−01 | −4.3352E−01 | 5.7696E−01 | −4.6958E−01 | 2.0494E−01 | −3.4113E−02 |
| S9 | −1.0876E−01 | −1.7367E−01 | 1.0238E+00 | −3.7515E+00 | 8.3668E+00 | −1.1663E+01 | 9.8890E+00 | −4.6772E+00 | 9.4438E−01 |
| S10 | −1.0384E−01 | −1.9300E−02 | 1.8065E−01 | −6.3873E−01 | 1.2377E+00 | −1.4406E+00 | 1.0009E+00 | −3.8520E−01 | 6.3491E−02 |
| S11 | −1.4562E−01 | 5.6270E−02 | −2.0255E−01 | 3.2428E−01 | −3.5500E−01 | 2.5809E−01 | −1.1121E−01 | 2.5436E−02 | −2.3745E−03 |
| S12 | −1.0677E−01 | −4.6590E−02 | 7.1134E−02 | −8.1032E−02 | 5.5173E−02 | −1.7032E−02 | 1.4873E−03 | 2.8263E−04 | −4.8242E−05 |
| S13 | −3.3324E−01 | 4.1588E−01 | −3.8706E−01 | 2.7976E−01 | −1.4146E−01 | 4.6799E−02 | −9.5591E−03 | 1.0917E−03 | −5.3343E−05 |
| S14 | −3.3172E−01 | 3.5650E−01 | −3.1000E−01 | 2.0655E−01 | −9.6737E−02 | 2.9904E−02 | −5.7780E−03 | 6.3122E−04 | −2.9673E−05 |

Figure 6A:
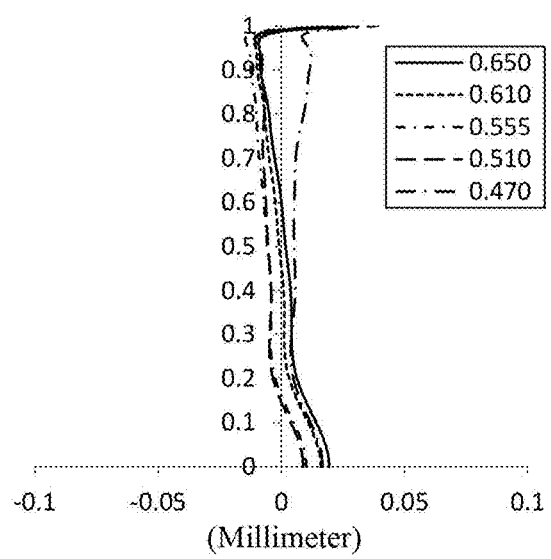
Figure 6B:
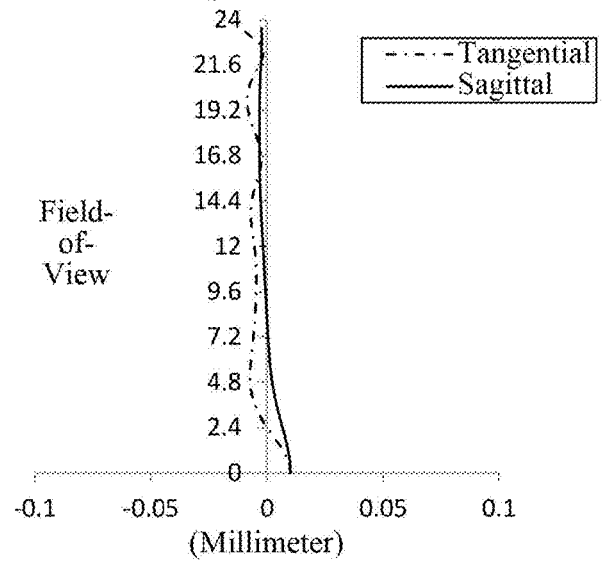

FIG. 6A illustrates a longitudinal aberration curve of the optical imaging lens group according to example 3, representing deviations of focal points converged by light of different wavelengths after passing through the lens assembly. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion at different field-of-views. FIG. 6D illustrates a lateral color curve of the optical imaging lens group according to example 3, representing deviations of different image heights on an imaging plane after light passes through the lens assembly. It can be seen from FIG. 6A to FIG. 6D that the optical imaging lens group provided in example 3 may achieve good image quality.

Example 4

An optical imaging lens group according to example 4 of the present disclosure is described below with reference to FIG. 7 to FIG. 8D. FIG. 7 is a schematic structural view of the optical imaging lens group according to example 4 of the present disclosure.

As shown in FIG. 7, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a concave surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a convex surface. The optical filter E8 has an object-side surface S15 and an image-side surface S16. Light from an object sequentially passes through the respective surfaces S1 to S16 and is finally imaged on the imaging plane S17.

Table 7 shows a basic parameter table of the optical imaging lens group in example 4, wherein the units for the radius of curvature, the thickness, and the focal length are millimeter (mm). Table 8 shows high-order coefficients applicable to each aspheric surface in example 4, wherein the surface shape of each aspheric surface may be defined by the formula (1) given in the above example 1.

TABLE 7

Example 4: f = 6.24 mm, TTL = 5.95 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.8819 | | | | |
| S1 | aspheric | 1.8762 | 1.2498 | 1.55 | 56.1 | 3.05 | −0.0063 |
| S2 | aspheric | −11.4679 | 0.0300 | | | | −3.3435 |
| S3 | aspheric | −142.4094 | 0.2400 | 1.67 | 20.4 | −3.88 | −99.0000 |
| S4 | aspheric | 2.6357 | 0.0560 | | | | 0.0508 |
| S5 | aspheric | 2.1265 | 0.2632 | 1.65 | 23.5 | 13.34 | 0.0104 |
| S6 | aspheric | 2.6900 | 0.3942 | | | | −0.9016 |
| S7 | aspheric | 14.4242 | 0.2400 | 1.55 | 56.1 | −11.41 | −4.0517 |
| S8 | aspheric | 4.3250 | 0.4338 | | | | −1.8689 |
| S9 | aspheric | 336.8275 | 0.3599 | 1.67 | 20.4 | 17.44 | −99.0000 |
| S10 | aspheric | −12.0188 | 0.6898 | | | | 44.7559 |
| S11 | aspheric | 3.8502 | 0.2400 | 1.55 | 56.1 | −65.12 | −54.3696 |
| S12 | aspheric | 3.3975 | 0.5364 | | | | −72.2771 |
| S13 | aspheric | −4.0937 | 0.4168 | 1.54 | 55.9 | −7.63 | 2.1193 |
| S14 | aspheric | −17690.6535 | 0.3920 | | | | 99.0000 |
| S15 | spherical | infinite | 0.1100 | 1.52 | 64.2 | | |
| S16 | spherical | infinite | 0.2980 | | | | |
| S17 | spherical | infinite | | | | | |

TABLE 8

| Surface number | A4 | A6 | A8 | A10 | A12 | A14 | A16 | A18 | A20 |
|---|---|---|---|---|---|---|---|---|---|
| S1 | −2.1045E−03 | −3.7522E−03 | 7.7180E−03 | −1.2185E−02 | 1.1370E−02 | −6.6223E−03 | 2.3174E−03 | −4.4937E−04 | 3.6629E−05 |
| S2 | −2.4088E−02 | 5.1814E−02 | −5.1819E−02 | 3.2020E−02 | −9.3934E−03 | −1.0972E−03 | 1.7755E−03 | −5.2062E−04 | 5.3244E−05 |
| S3 | −4.8841E−02 | 7.5466E−02 | −7.3454E−02 | 3.6149E−02 | 8.1830E−03 | −2.1715E−02 | 1.2143E−02 | −3.0699E−03 | 3.0295E−04 |
| S4 | −1.6630E−01 | 1.5801E−01 | −2.5247E−01 | 2.9514E−01 | −1.6580E−01 | 6.1045E−03 | 4.0784E−02 | −1.9011E−02 | 2.7659E−03 |
| S5 | −1.6632E−01 | 1.1735E−01 | −1.8449E−01 | 1.8898E−01 | 6.7658E−02 | −3.2240E−01 | 2.8271E−01 | −1.0698E−01 | 1.5309E−02 |
| S6 | −1.3701E−02 | 6.8219E−02 | −2.2744E−01 | 8.2940E−01 | −1.6578E+00 | 2.1607E+00 | −1.8066E+00 | 8.6334E−01 | −1.7568E−01 |
| S7 | −3.9806E−02 | 8.6112E−02 | 1.0850E−01 | −4.2373E−01 | 8.4313E−01 | −9.9990E−01 | 6.8326E−01 | −2.4381E−01 | 3.5172E−02 |
| S8 | −6.7773E−02 | 1.2900E−01 | −1.1033E−01 | 2.0224E−01 | −3.4368E−01 | 4.0068E−01 | −2.9127E−01 | 1.0981E−01 | −1.2841E−02 |
| S9 | −1.1497E−01 | −1.7097E−01 | 1.0581E+00 | −3.8996E+00 | 8.7146E+00 | −1.2175E+01 | 1.0349E+01 | −4.9088E+00 | 9.9443E−01 |
| S10 | −1.0981E−01 | −5.8515E−03 | 1.5051E−01 | −5.7087E−01 | 1.1299E+00 | −1.3335E+00 | 9.3660E−01 | −3.6399E−01 | 6.0581E−02 |
| S11 | −1.4847E−01 | 6.5487E−02 | −2.3830E−01 | 3.9624E−01 | −4.2855E−01 | 2.9708E−01 | −1.2161E−01 | 2.6602E−02 | −2.3949E−03 |
| S12 | −9.9825E−02 | −5.8877E−02 | 6.2598E−02 | −4.3140E−02 | 1.0697E−02 | 9.6518E−03 | −7.3115E−03 | 1.8011E−03 | −1.5576E−04 |
| S13 | −3.2037E−01 | 4.0394E−01 | −4.0367E−01 | 3.1512E−01 | −1.6774E−01 | 5.7396E−02 | −1.2026E−02 | 1.4040E−03 | −7.0027E−05 |
| S14 | −3.1953E−01 | 3.4689E−01 | −3.1456E−01 | 2.1973E−01 | −1.0642E−01 | 3.3614E−02 | −6.5893E−03 | 7.2746E−04 | −3.4490E−05 |

Figure 8A:
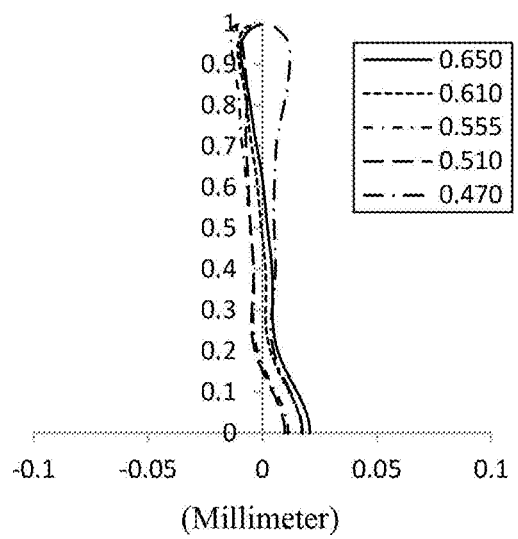
FIGS. 8A to 8D illustrate a longitudinal aberration curve, an astigmatic curve, a distortion curve and a lateral color curve of the optical imaging lens group of the Example 4, respectively.
Figure 8B:
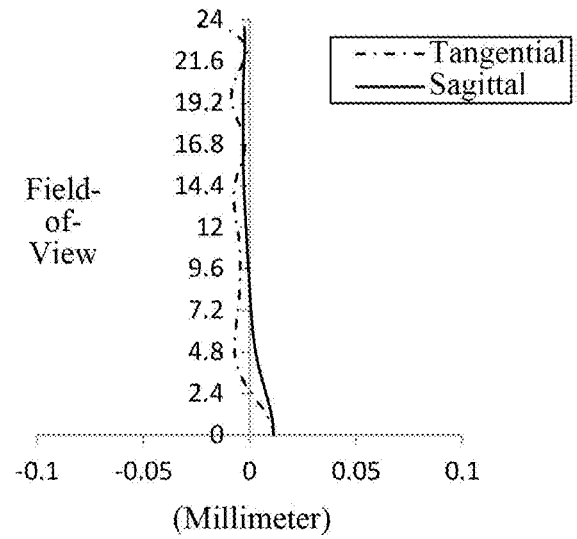
Figure 8C:
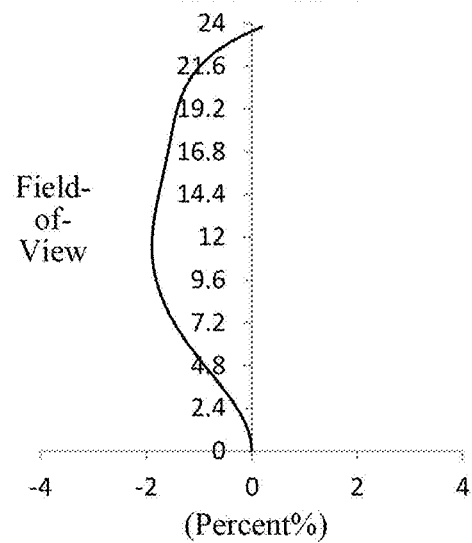
Figure 8D:
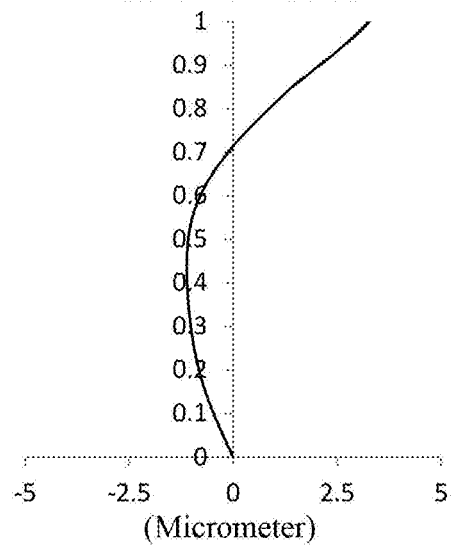

FIG. 8A illustrates a longitudinal aberration curve of the optical imaging lens group according to example 4, representing deviations of focal points converged by light of different wavelengths after passing through the lens assembly. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion at different field-of-views. FIG. 8D illustrates a lateral color curve of the optical imaging lens group according to example 4, representing deviations of different image heights on an imaging plane after light passes through the lens assembly. It can be seen from FIG. 8A to FIG. 8D that the optical imaging lens group provided in example 4 may achieve good image quality.

Example 5

Figure 9:
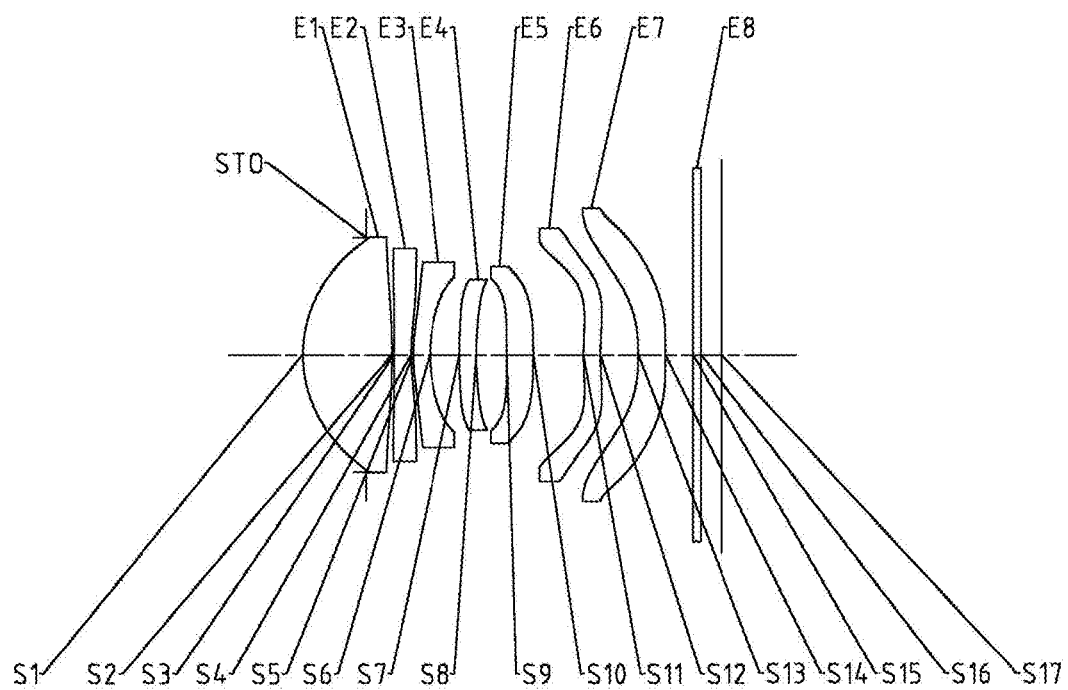
FIG. 9 illustrates a schematic structural view of an optical imaging lens group according to Example 5 of the present disclosure.

An optical imaging lens group according to example 5 of the present disclosure is described below with reference to FIG. 9 to FIG. 10D. FIG. 9 is a schematic structural view of the optical imaging lens group according to example 5 of the present disclosure.

As shown in FIG. 9, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a negative refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 9 shows a basic parameter table of the optical imaging lens group in example 5, wherein the units for the radius of curvature, the thickness, and the focal length are millimeter (mm). Table 10 shows high-order coefficients applicable to each aspheric surface in example 5, wherein the surface shape of each aspheric surface may be defined by the formula (1) given in the above example 1.

TABLE 9

Example 5: $l$ = 6.24 mm, TTL = 5.95 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.8967 | | | | |
| S1 | aspheric | 1.8697 | 1.2642 | 1.55 | 56.1 | 3.04 | −0.0067 |
| S2 | aspheric | −11.3098 | 0.0323 | | | | −4.9012 |
| S3 | aspheric | 134.8342 | 0.2400 | 1.67 | 20.4 | −4.94 | −99.0000 |
| S4 | aspheric | 3.2085 | 0.0300 | | | | 0.4289 |
| S5 | aspheric | 2.5000 | 0.2400 | 1.65 | 23.5 | −84.28 | 0.0596 |
| S6 | aspheric | 2.3000 | 0.4208 | | | | −1.1538 |
| S7 | aspheric | 8.9201 | 0.2400 | 1.55 | 56.1 | −17.04 | −13.6631 |
| S8 | aspheric | 4.5100 | 0.4337 | | | | −4.5624 |
| S9 | aspheric | 489.1238 | 0.3767 | 1.67 | 20.4 | 15.00 | 99.0000 |
| S10 | aspheric | −10.1881 | 0.7097 | | | | 44.6561 |
| S11 | aspheric | 4.5229 | 0.2400 | 1.55 | 56.1 | −42.84 | −51.4970 |
| S12 | aspheric | 3.7189 | 0.5382 | | | | −86.4871 |
| S13 | aspheric | −4.2172 | 0.3843 | 1.54 | 55.9 | −7.35 | 2.3477 |
| S14 | aspheric | 62.4423 | 0.3920 | | | | 1.1701 |
| S15 | spherical | infinite | 0.1100 | 1.52 | 64.2 | | |
| S16 | spherical | infinite | 0.2981 | | | | |
| S17 | spherical | infinite | | | | | |

TABLE 10

| Surface number | A4 | A6 | A8 | A10 | A12 |
|---|---|---|---|---|---|
| S1 | −1.8426E−03 | −3.7398E−03 | 7.7284E−03 | −1.1593E−02 | 1.0242E−02 |
| S2 | −2.2675E−02 | 4.0823E−02 | −2.8643E−02 | 7.5233E−03 | 6.7177E−03 |
| S3 | −3.2909E−02 | 2.3761E−02 | 4.8273E−03 | −4.2969E−02 | 6.5402E−02 |
| S4 | −1.5837E−01 | 2.1438E−01 | −5.2221E−01 | 8.0163E−01 | −6.9459E−01 |
| S5 | −1.9522E−01 | 2.7022E−01 | −6.1983E−01 | 9.5523E−01 | −8.2685E−01 |
| S6 | −2.6399E−02 | 1.1721E−01 | −3.3394E−01 | 1.0303E+00 | −1.9668E+00 |
| S7 | −2.6949E−02 | 3.6528E−02 | 2.2641E−01 | −6.8072E−01 | 1.2611E+00 |
| S8 | −5.9357E−02 | 6.5312E−02 | 9.3549E−02 | −3.6098E−01 | 7.8970E−01 |
| S9 | −9.8220E−02 | −2.2407E−01 | 1.2623E+00 | −4.4618E+00 | 9.7171E+00 |
| S10 | −8.9941E−02 | −5.0241E−02 | 2.8271E−01 | −8.6358E−01 | 1.5563E+00 |
| S11 | −1.7441E−01 | 1.4886E−01 | −4.2279E−01 | 6.5250E−01 | −6.6124E−01 |
| S12 | −9.4953E−02 | −2.4744E−02 | −3.7765E−02 | 9.3595E−02 | −1.0104E−01 |
| S13 | −3.4411E−01 | 4.9537E−01 | −5.3947E−01 | 4.2605E−01 | −2.2522E−01 |
| S14 | −3.4829E−01 | 4.1540E−01 | −3.9614E−01 | 2.7737E−01 | −1.3230E−01 |

| Surface number | A14 | A16 | A18 | A20 |
|---|---|---|---|---|
| S1 | −5.6101E−03 | 1.8333E−03 | −3.2905E−04 | 2.4234E−05 |
| S2 | −8.2625E−03 | 3.9460E−03 | −9.3040E−04 | 8.9145E−05 |
| S3 | −5.0834E−02 | 2.2052E−02 | −5.0927E−03 | 4.8945E−04 |
| S4 | 3.4597E−01 | −9.4257E−02 | 1.1531E−02 | −2.4164E−04 |
| S5 | 3.8180E−01 | −7.3562E−02 | −3.9925E−03 | 2.5312E−03 |
| S6 | 2.4315E+00 | −1.9047E+00 | 8.5629E−01 | −1.6627E−01 |
| S7 | −1.4516E+00 | 9.9105E−01 | −3.6402E−01 | 5.5820E−02 |
| S8 | −1.0812E+00 | 9.0468E−01 | −4.3218E−01 | 9.3044E−02 |
| S9 | −1.3277E+01 | 1.1056E+01 | −5.1397E+00 | 1.0207E+00 |
| S10 | −1.7225E+00 | 1.1480E+00 | −4.2525E−01 | 6.7507E−02 |
| S11 | 4.3520E−01 | −1.7255E−01 | 3.7086E−02 | −3.3094E−03 |
| S12 | 6.6373E−02 | −2.4621E−02 | 4.6925E−03 | −3.5834E−04 |
| S13 | 7.6859E−02 | −1.6185E−02 | 1.9103E−03 | −9.6685E−05 |
| S14 | 4.1086E−02 | −7.9327E−03 | 8.6457E−04 | −4.0556E−05 |

Figure 10A:
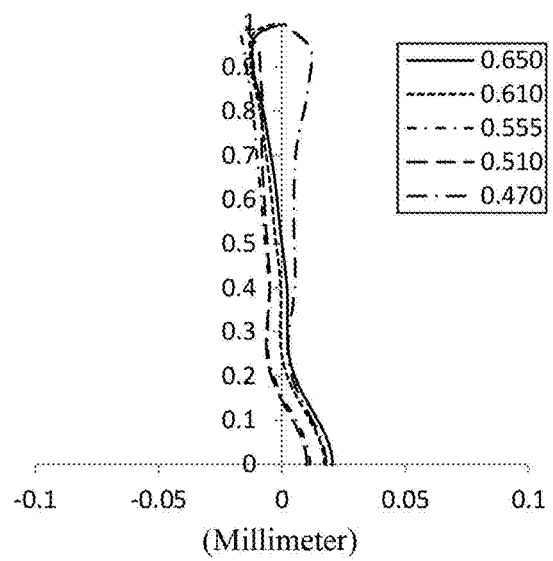
FIGS. 10A to 10D illustrate a longitudinal aberration curve, an astigmatic curve, a distortion curve and a lateral color curve of the optical imaging lens group of the Example 5, respectively.
Figure 10B:
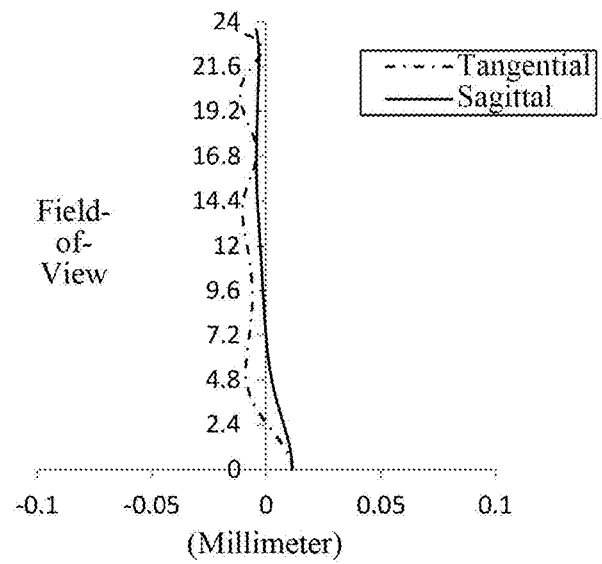
Figure 10C:
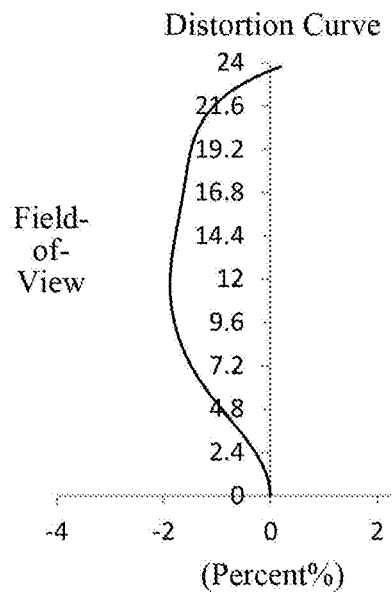
Figure 10D:
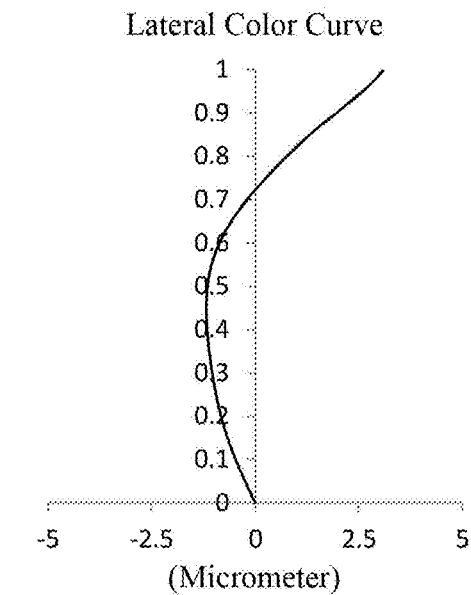

FIG. 10A illustrates a longitudinal aberration curve of the optical imaging lens group according to example 5, representing deviations of focal points converged by light of different wavelengths after passing through the lens assembly. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion at different field-of-views. FIG. 10D illustrates a lateral color curve of the optical imaging lens group according to example 5, representing deviations of different image heights on an imaging plane after light passes through the lens assembly. It can be seen from FIG. 10A to FIG. 10D that the optical imaging lens group provided in example 5 may achieve good image quality.

Example 6

Figure 11:
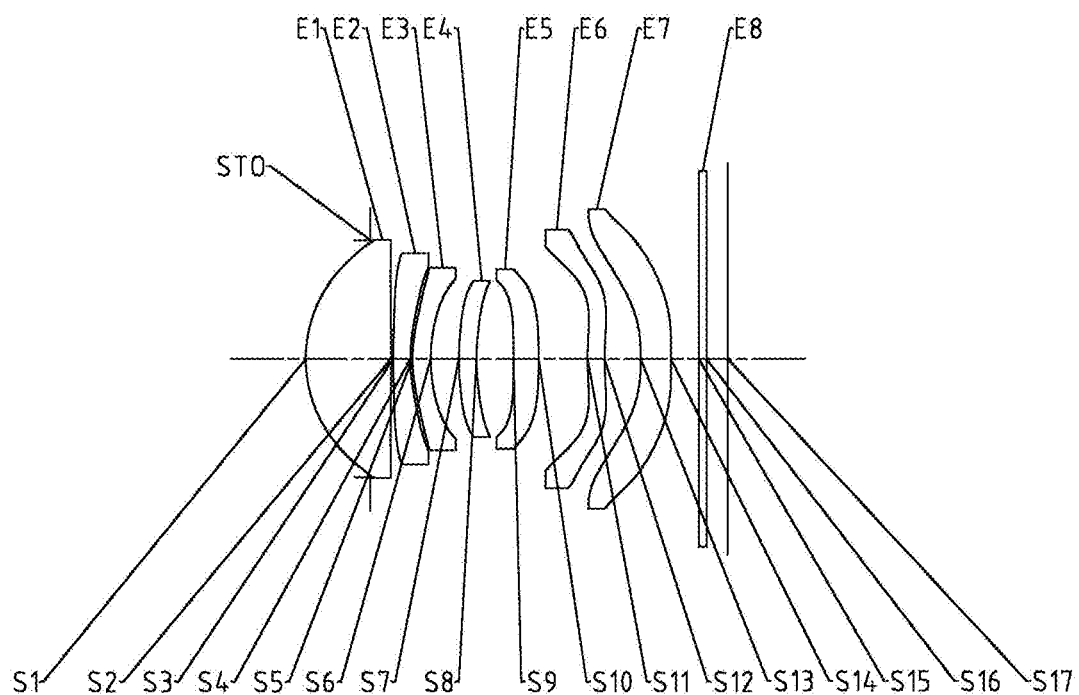
FIG. 11 illustrates a schematic structural view of an optical imaging lens group according to Example 6 of the present disclosure.

An optical imaging lens group according to example 6 of the present disclosure is described below with reference to FIG. 11 to FIG. 12D. FIG. 11 is a schematic structural view of the optical imaging lens group according to example 6 of the present disclosure.

As shown in FIG. 11, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 11 shows a basic parameter table of the optical imaging lens group in example 6, wherein the units for the radius of curvature, the thickness, and the focal length are millimeter (mm). Table 12 shows high-order coefficients applicable to each aspheric surface in example 6, wherein the surface shape of each aspheric surface may be defined by the formula (1) given in the above example 1.

TABLE 11

Example 6: f = 6.24 mm, TTL = 5.94 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.9097 | | | | |
| S1 | aspheric | 1.8627 | 1.2021 | 1.55 | 56.1 | 3.41 | −0.0069 |
| S2 | aspheric | 2110.5768 | 0.0300 | | | | −99.0000 |
| S3 | aspheric | 11.0372 | 0.2400 | 1.67 | 20.4 | −4.24 | 38.0697 |
| S4 | aspheric | 2.2277 | 0.0300 | | | | 0.6127 |
| S5 | aspheric | 1.9386 | 0.2574 | 1.65 | 23.5 | 16.34 | −0.0504 |
| S6 | aspheric | 2.2533 | 0.3961 | | | | −1.4696 |
| S7 | aspheric | 3.8543 | 0.2476 | 1.55 | 56.1 | −38.38 | −19.4528 |
| S8 | aspheric | 3.1815 | 0.5209 | | | | −6.8160 |
| S9 | aspheric | −62.4099 | 0.3551 | 1.67 | 20.4 | 20.77 | −99.0000 |
| S10 | aspheric | −11.3460 | 0.6859 | | | | 50.8231 |
| S11 | aspheric | 3.9176 | 0.2400 | 1.55 | 56.1 | −53.83 | −44.4199 |
| S12 | aspheric | 3.3820 | 0.5096 | | | | −85.9128 |
| S13 | aspheric | −4.4430 | 0.4250 | 1.54 | 55.9 | −7.06 | 2.5691 |
| S14 | aspheric | 26.5099 | 0.3921 | | | | 59.5273 |
| S15 | spherical | infinite | 0.1100 | 1.52 | 64.2 | | |
| S16 | spherical | infinite | 0.2982 | | | | |
| S17 | spherical | infinite | | | | | |

TABLE 12

| Surface number | A4 | A6 | A8 | A10 | A12 |
|---|---|---|---|---|---|
| S1 | −1.3931E−03 | −4.0012E−03 | 8.0607E−03 | −1.0843E−02 | 8.3695E−03 |
| S2 | −5.6757E−02 | 1.1196E−01 | −1.2351E−01 | 9.5205E−02 | −5.3660E−02 |
| S3 | −5.8756E−02 | 8.3388E−02 | −7.0562E−02 | 3.3218E−02 | −1.8170E−03 |
| S4 | −1.7431E−01 | 3.1714E−01 | −7.1120E−01 | 9.1013E−01 | −6.2576E−01 |
| S5 | −2.2000E−01 | 3.8931E−01 | −7.3917E−01 | 6.8590E−01 | −4.4629E−02 |
| S6 | −4.6161E−02 | 1.5262E−01 | −1.9765E−01 | 2.4174E−01 | −2.3325E−01 |

TABLE 12-continued

| | | | | | |
|---|---|---|---|---|---|
| S7 | −3.3167E−02 | 6.3319E−02 | 1.3027E−01 | −4.1948E−01 | 7.2581E−01 |
| S8 | −6.3922E−02 | 9.0441E−02 | 3.0226E−02 | −3.1853E−01 | 8.8907E−01 |
| S9 | −9.0350E−02 | −2.1443E−01 | 1.2242E+00 | −4.2340E+00 | 8.9279E+00 |
| S10 | −9.8869E−02 | −2.9194E−02 | 2.5138E−01 | −8.3147E−01 | 1.5257E+00 |
| S11 | −1.8146E−01 | 1.6137E−01 | −4.1784E−01 | 6.1917E−01 | −6.3078E−01 |
| S12 | −8.6672E−02 | −7.8118E−02 | 1.2015E−01 | −1.4049E−01 | 1.0545E−01 |
| S13 | −3.6046E−01 | 5.0898E−01 | −5.2616E−01 | 4.0611E−01 | −2.1481E−01 |
| S14 | −3.5221E−01 | 4.1110E−01 | −3.7582E−01 | 2.5457E−01 | −1.1917E−01 |

| Surface number | A14 | A16 | A18 | A20 |
|---|---|---|---|---|
| S1 | −3.8175E−03 | 9.5083E−04 | −1.0790E−04 | 1.8005E−06 |
| S2 | 2.1943E−02 | −6.0954E−03 | 1.0020E−03 | −7.1774E−05 |
| S3 | −6.3644E−03 | 3.5949E−03 | −9.5349E−04 | 1.1176E−04 |
| S4 | 2.2572E−01 | −3.6348E−02 | 1.6351E−03 | −2.5632E−04 |
| S5 | −4.4716E−01 | 3.7652E−01 | −1.2831E−01 | 1.6262E−02 |
| S6 | 3.0152E−01 | −3.6075E−01 | 2.3070E−01 | −5.6132E−02 |
| S7 | −7.5445E−01 | 4.6151E−01 | −1.5218E−01 | 2.1617E−02 |
| S8 | −1.4013E+00 | 1.2972E+00 | −6.6039E−01 | 1.4422E−01 |
| S9 | −1.1807E+01 | 9.5257E+00 | −4.2949E+00 | 8.2825E−01 |
| S10 | −1.6951E+00 | 1.1293E+00 | −4.1710E−01 | 6.5886E−02 |
| S11 | 4.3299E−01 | −1.8166E−01 | 4.1364E−02 | −3.8971E−03 |
| S12 | −4.2891E−02 | 9.0468E−03 | −8.5870E−04 | 1.9850E−05 |
| S13 | 7.3780E−02 | −1.5594E−02 | 1.8390E−03 | −9.2661E−05 |
| S14 | 3.6643E−02 | −7.0372E−03 | 7.6464E−04 | −3.5805E−05 |

Figure 12A:
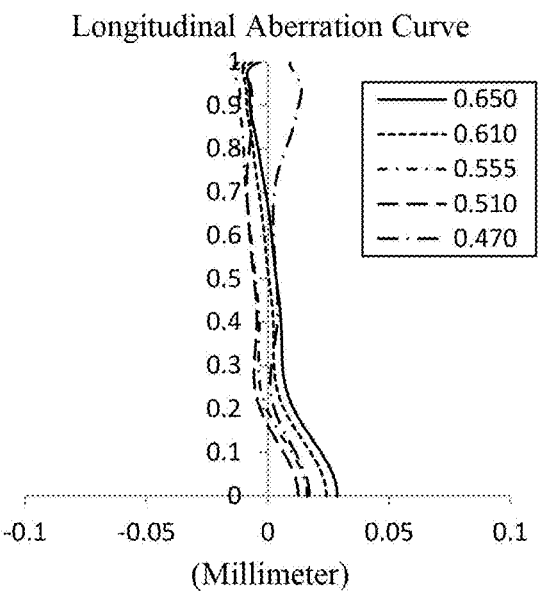
FIGS. 12A to 12D illustrate a longitudinal aberration curve, an astigmatic curve, a distortion curve and a lateral color curve of the optical imaging lens group of the Example 6, respectively.
Figure 12B:
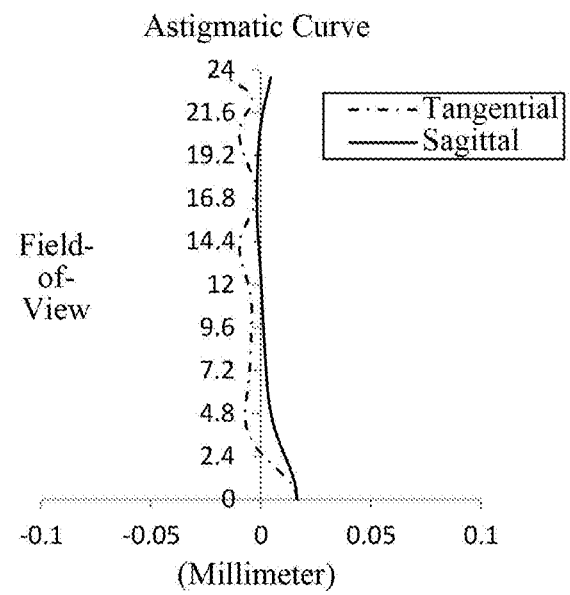
Figure 12C:
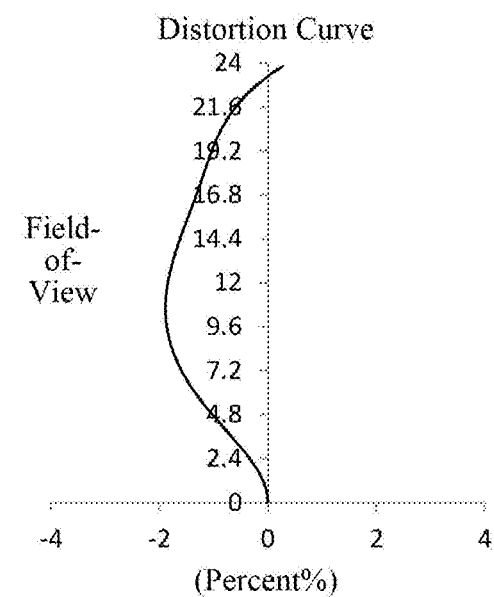
Figure 12D:
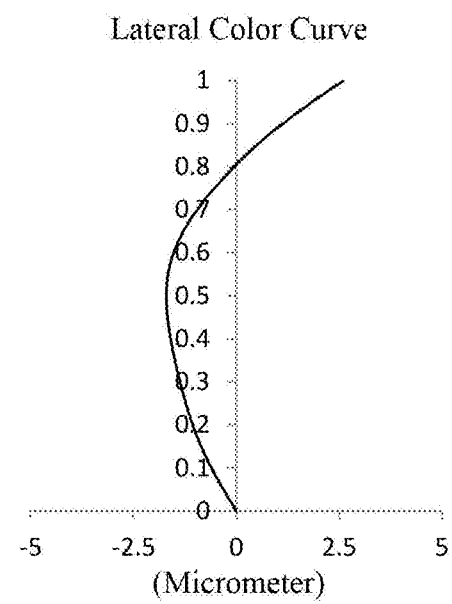

FIG. 12A illustrates a longitudinal aberration curve of the optical imaging lens group according to example 6, representing deviations of focal points converged by light of different wavelengths after passing through the lens assembly. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion at different field-of-views. FIG. 12D illustrates a lateral color curve of the optical imaging lens group according to example 6, representing deviations of different image heights on an imaging plane after light passes through the lens assembly. It can be seen from FIG. 12A to FIG. 12D that the optical imaging lens group provided in example 6 may achieve good image quality.

Example 7

Figure 13:
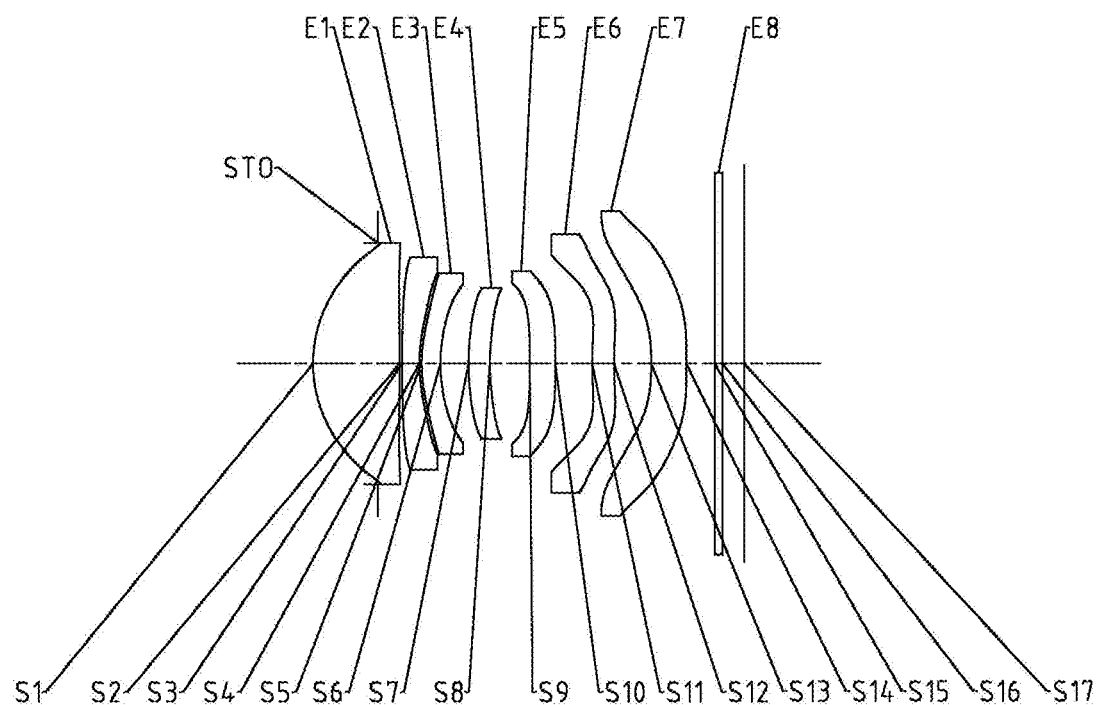
FIG. 13 illustrates a schematic structural view of an optical imaging lens group according to Example 7 of the present disclosure.

An optical imaging lens group according to example 7 of the present disclosure is described below with reference to FIG. 13 to FIG. 14D. FIG. 13 is a schematic structural view of the optical imaging lens group according to example 7 of the present disclosure.

As shown in FIG. 13, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a positive refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 13 shows a basic parameter table of the optical imaging lens group in example 7, wherein the units for the radius of curvature, the thickness, and the focal length are millimeter (mm). Table 14 shows high-order coefficients applicable to each aspheric surface in example 7, wherein the surface shape of each aspheric surface may be defined by the formula (1) given in the above example 1.

TABLE 13

Example 7: f = 6.24 mm, TTL = 5.96 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.8946 | | | | |
| S1 | aspheric | 1.8620 | 1.1972 | 1.55 | 56.1 | 3.42 | −0.0085 |
| S2 | aspheric | 822.0895 | 0.0319 | | | | 99.0000 |

TABLE 13-continued

Example 7: f = 6.24 mm, TTL = 5.96 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| S3 | aspheric | 11.0665 | 0.2412 | 1.67 | 20.4 | −4.17 | 37.9874 |
| S4 | aspheric | 2.1980 | 0.0300 | | | | 0.6039 |
| S5 | aspheric | 1.9208 | 0.2608 | 1.65 | 23.5 | 16.93 | −0.0470 |
| S6 | aspheric | 2.2078 | 0.3892 | | | | −1.9836 |
| S7 | aspheric | 3.4900 | 0.2949 | 1.55 | 56.1 | 180.72 | −16.8912 |
| S8 | aspheric | 3.5100 | 0.5502 | | | | −5.7096 |
| S9 | aspheric | −63.0000 | 0.3526 | 1.67 | 20.4 | −7049.90 | 99.0000 |
| S10 | aspheric | −64.0000 | 0.5106 | | | | 99.0000 |
| S11 | aspheric | 3.7412 | 0.3007 | 1.55 | 56.1 | −604.49 | −50.2248 |
| S12 | aspheric | 3.5943 | 0.5161 | | | | −87.8996 |
| S13 | aspheric | −4.6030 | 0.4843 | 1.54 | 55.9 | −7.57 | 2.5133 |
| S14 | aspheric | 35.6997 | 0.3920 | | | | 99.0000 |
| S15 | spherical | infinite | 0.1100 | 1.52 | 64.2 | | |
| S16 | spherical | infinite | 0.2981 | | | | |
| S17 | spherical | infinite | | | | | |

TABLE 14

| Surface number | A4 | A6 | A8 | A10 | A12 |
|---|---|---|---|---|---|
| S1 | −1.6401E−03 | −2.0722E−03 | 2.3497E−03 | −1.9702E−03 | 2.9048E−04 |
| S2 | −6.3176E−02 | 1.5452E−01 | −2.2493E−01 | 2.2616E−01 | −1.5297E−01 |
| S3 | −7.7659E−02 | 1.7061E−01 | −2.7166E−01 | 2.9440E−01 | −2.0058E−01 |
| S4 | −2.0781E−01 | 5.1613E−01 | −1.0804E+00 | 1.0033E+00 | −4.5655E−02 |
| S5 | −2.4173E−01 | 5.0474E−01 | −8.0422E−01 | 5.8578E−02 | 1.6206E+00 |
| S6 | −4.9084E−02 | 1.0850E−01 | 4.9097E−02 | −5.8378E−01 | 1.3520E+00 |
| S7 | −1.3387E−02 | 2.3284E−02 | 1.8253E−01 | −6.1443E−01 | 1.2718E+00 |
| S8 | −4.4438E−02 | 2.2246E−02 | 2.0691E−01 | −7.4328E−01 | 1.6305E+00 |
| S9 | −9.7218E−02 | −2.0857E−01 | 1.2390E+00 | −4.1985E+00 | 8.6137E+00 |
| S10 | −1.4913E−01 | 6.7130E−02 | 1.4035E−02 | −3.6665E−01 | 8.7424E−01 |
| S11 | −2.0459E−01 | 1.5367E−01 | −4.4696E−01 | 7.3644E−01 | −8.3660E−01 |
| S12 | −1.2781E−01 | −3.2505E−02 | 7.3814E−02 | −1.0114E−01 | 8.5691E−02 |
| S13 | −3.2759E−01 | 4.1964E−01 | −4.0259E−01 | 3.0643E−01 | −1.6442E−01 |
| S14 | −3.1596E−01 | 3.4075E−01 | −2.9579E−01 | 1.9824E−01 | −9.3792E−02 |

| Surface number | A14 | A16 | A18 | A20 |
|---|---|---|---|---|
| S1 | 6.0492E−04 | −4.8518E−04 | 1.4906E−04 | −1.7936E−05 |
| S2 | 6.7568E−02 | −1.8622E−02 | 2.8963E−03 | −1.9324E−04 |
| S3 | 8.3098E−02 | −1.9473E−02 | 2.1122E−03 | −4.1415E−05 |
| S4 | −6.5632E−01 | 5.3237E−01 | −1.7509E−01 | 2.1355E−02 |
| S5 | −2.3463E+00 | 1.5210E+00 | −4.8539E−01 | 6.1823E−02 |
| S6 | −1.4987E+00 | 8.6030E−01 | −2.3130E−01 | 1.8942E−02 |
| S7 | −1.5894E+00 | 1.1865E+00 | −4.8914E−01 | 8.6487E−02 |
| S8 | −2.2533E+00 | 1.9226E+00 | −9.2608E−01 | 1.9408E−01 |
| S9 | −1.1089E+01 | 8.7323E+00 | −3.8569E+00 | 7.3169E−01 |
| S10 | −1.0788E+00 | 7.5855E−01 | −2.8972E−01 | 4.6919E−02 |
| S11 | 6.3763E−01 | −2.9418E−01 | 7.3215E−02 | −7.5192E−03 |
| S12 | −3.6616E−02 | 7.6093E−03 | −6.2961E−04 | 1.9877E−06 |
| S13 | 5.7553E−02 | −1.2361E−02 | 1.4750E−03 | −7.4923E−05 |
| S14 | 2.9284E−02 | −5.7032E−03 | 6.2633E−04 | −2.9524E−05 |

Figure 14A:
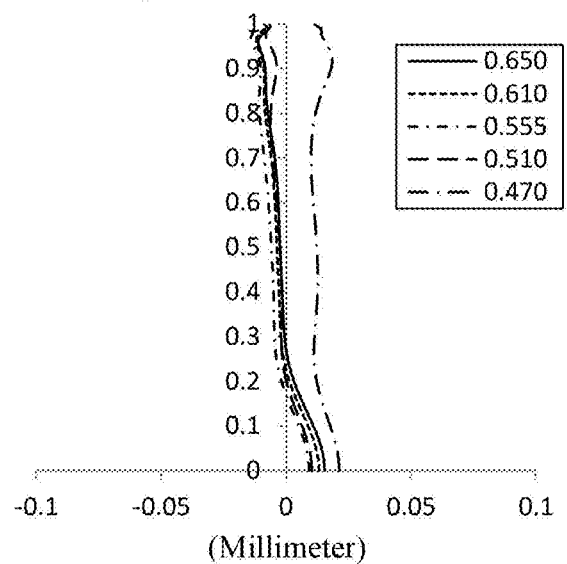
FIGS. 14A to 14D illustrate a longitudinal aberration curve, an astigmatic curve, a distortion curve and a lateral color curve of the optical imaging lens group of the Example 7, respectively.
Figure 14B:
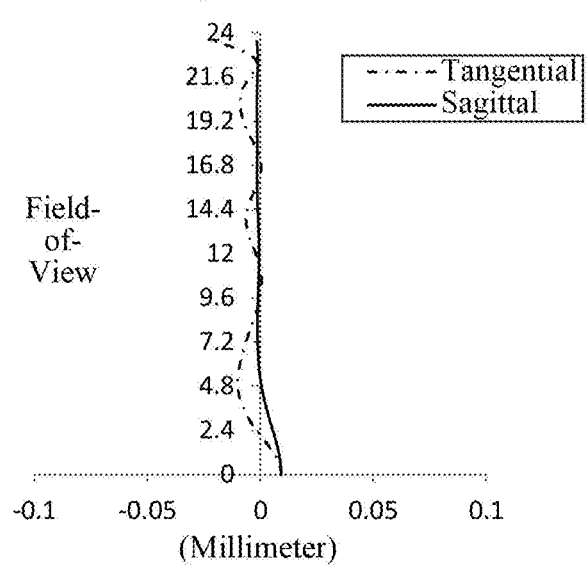
Figures 14C, 14D:
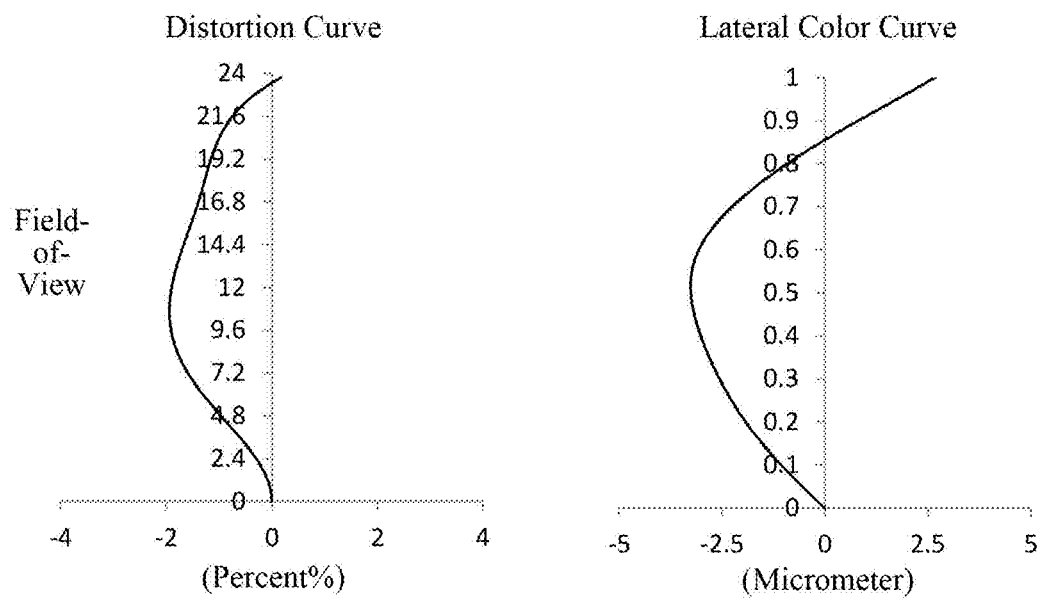

FIG. 14A illustrates a longitudinal aberration curve of the optical imaging lens group according to example 7, representing deviations of focal points converged by light of different wavelengths after passing through the lens assembly. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion at different field-of-views. FIG. 14D illustrates a lateral color curve of the optical imaging lens group according to example 7, representing deviations of different image heights on an imaging plane after light passes through the lens assembly. It can be seen from FIG. 14A to FIG. 14D that the optical imaging lens group provided in example 7 may achieve good image quality.

Example 8

Figure 15:
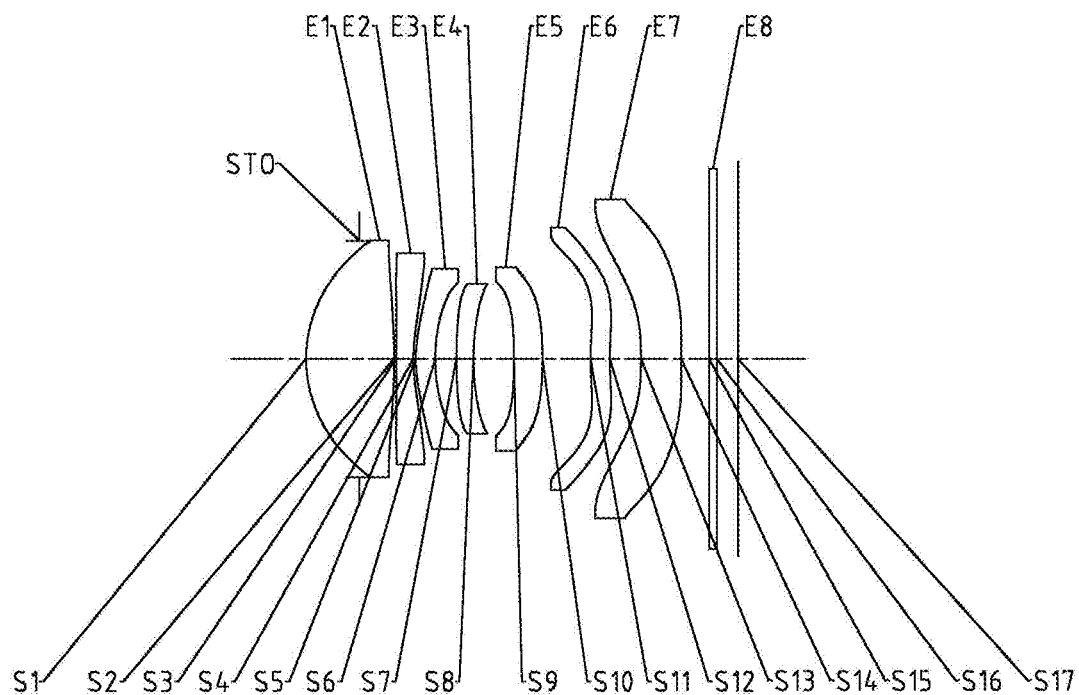
FIG. 15 illustrates a schematic structural view of an optical imaging lens group according to Example 8 of the present disclosure.

An optical imaging lens group according to example 8 of the present disclosure is described below with reference to FIG. 15 to FIG. 16D. FIG. 15 is a schematic structural view of the optical imaging lens group according to example 8 of the present disclosure.

As shown in FIG. 15, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 15 shows a basic parameter table of the optical imaging lens group in example 8, wherein the units for the radius of curvature, the thickness, and the focal length are millimeter (mm). Table 16 shows high-order coefficients applicable to each aspheric surface in example 8, wherein the surface shape of each aspheric surface may be defined by the formula (1) given in the above example 1.

TABLE 15

Example 8: f = 6.20 mm, TTL = 6.07 mm, ImgH = 2.75 mm, Semi-FOV = 23.9°

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.7495 | | | | |
| S1 | aspheric | 1.8974 | 1.2364 | 1.55 | 56.1 | 3.09 | −0.0008 |
| S2 | aspheric | −11.6943 | 0.0304 | | | | −1.9088 |
| S3 | aspheric | 39.6279 | 0.2400 | 1.67 | 20.4 | −3.93 | 99.0000 |
| S4 | aspheric | 2.4464 | 0.0348 | | | | 0.0315 |
| S5 | aspheric | 1.9823 | 0.2720 | 1.65 | 23.5 | 13.29 | −0.0347 |
| S6 | aspheric | 2.4417 | 0.2993 | | | | −0.7328 |
| S7 | aspheric | 7.0497 | 0.2400 | 1.55 | 56.1 | −12.81 | −3.1902 |
| S8 | aspheric | 3.4685 | 0.5669 | | | | −0.3256 |
| S9 | aspheric | −11.7373 | 0.4011 | 1.67 | 20.4 | 22.07 | 82.2948 |
| S10 | aspheric | −6.6140 | 0.6758 | | | | 5.7881 |
| S11 | aspheric | 4.1147 | 0.2707 | 1.55 | 56.1 | −377.01 | −80.3673 |
| S12 | aspheric | 3.9404 | 0.4404 | | | | −78.8917 |
| S13 | aspheric | −5.8080 | 0.5629 | 1.54 | 55.9 | −8.28 | 3.1371 |
| S14 | aspheric | 19.5854 | 0.3924 | | | | 46.4556 |
| S15 | spherical | infinite | 0.1100 | 1.52 | 64.2 | | |
| S16 | spherical | infinite | 0.2985 | | | | |
| S17 | spherical | infinite | | | | | |

TABLE 16

| Surface number | A4 | A6 | A8 | A10 | A12 |
|---|---|---|---|---|---|
| S1 | −2.6159E−03 | −6.9530E−04 | −2.3187E−04 | −2.2915E−04 | 3.3723E−04 |
| S2 | −2.3890E−02 | 4.9042E−02 | −5.8276E−02 | 5.9851E−02 | −4.6160E−02 |
| S3 | −4.0477E−02 | 6.1866E−02 | −9.8784E−02 | 1.3493E−01 | −1.2161E−01 |
| S4 | −1.7060E−01 | 2.3569E−01 | −5.8818E−01 | 1.0214E+00 | −1.0769E+00 |
| S5 | −1.8050E−01 | 2.1052E−01 | −5.1232E−01 | 8.6200E−01 | −7.8545E−01 |
| S6 | −7.8123E−03 | 3.2260E−02 | −9.3854E−02 | 4.7440E−01 | −1.0184E+00 |
| S7 | −2.4183E−02 | 7.1601E−02 | −5.5569E−02 | 2.2797E−01 | −4.4252E−01 |
| S8 | −3.8777E−02 | 8.8985E−02 | −1.7030E−01 | 5.5751E−01 | −1.1674E+00 |
| S9 | −9.5236E−02 | −3.7567E−02 | 2.6361E−01 | −1.1259E+00 | 2.6801E+00 |
| S10 | −9.6113E−02 | 2.2482E−02 | 1.1893E−02 | −1.4847E−01 | 3.3791E−01 |
| S11 | −8.7043E−02 | −4.9224E−02 | 5.7435E−02 | −4.6752E−02 | 1.5624E−02 |
| S12 | −1.1998E−01 | 1.6528E−02 | −4.8506E−03 | −4.2562E−04 | −1.3417E−03 |
| S13 | −2.1320E−01 | 2.1494E−01 | −1.4829E−01 | 7.6459E−02 | −2.8858E−02 |
| S14 | −1.8400E−01 | 1.5162E−01 | −9.6908E−02 | 4.7242E−02 | −1.7196E−02 |

| Surface number | A14 | A16 | A18 | A20 |
|---|---|---|---|---|
| S1 | −3.4999E−04 | 1.8051E−04 | −5.1493E−05 | 5.8348E−06 |
| S2 | 2.3832E−02 | −7.6565E−03 | 1.3806E−03 | −1.0658E−04 |
| S3 | 6.9097E−02 | −2.3885E−02 | 4.5815E−03 | −3.7436E−04 |
| S4 | 6.9650E−01 | −2.7018E−01 | 5.7434E−02 | −5.1171E−03 |
| S5 | 3.4167E−01 | −2.1964E−02 | −3.2563E−02 | 8.0134E−03 |

TABLE 16-continued

| | | | | |
|---|---|---|---|---|
| S6 | 1.4165E+00 | −1.2751E+00 | 6.5481E−01 | −1.4142E−01 |
| S7 | 5.3450E−01 | −4.2905E−01 | 2.0695E−01 | −4.3306E−02 |
| S8 | 1.5221E+00 | −1.2111E+00 | 5.3309E−01 | −9.7024E−02 |
| S9 | −3.8931E+00 | 3.3957E+00 | −1.6441E+00 | 3.3938E−01 |
| S10 | −4.0825E−01 | 2.8255E−01 | −1.0670E−01 | 1.7209E−02 |
| S11 | 7.3871E−03 | −7.6879E−03 | 2.2708E−03 | −2.3187E−04 |
| S12 | 3.8527E−03 | −2.1159E−03 | 4.5743E−04 | −3.5616E−05 |
| S13 | 7.7676E−03 | −1.3991E−03 | 1.4927E−04 | −7.0615E−06 |
| S14 | 4.3452E−03 | −7.0522E−04 | 6.5598E−05 | −2.6393E−06 |

Figure 16A:
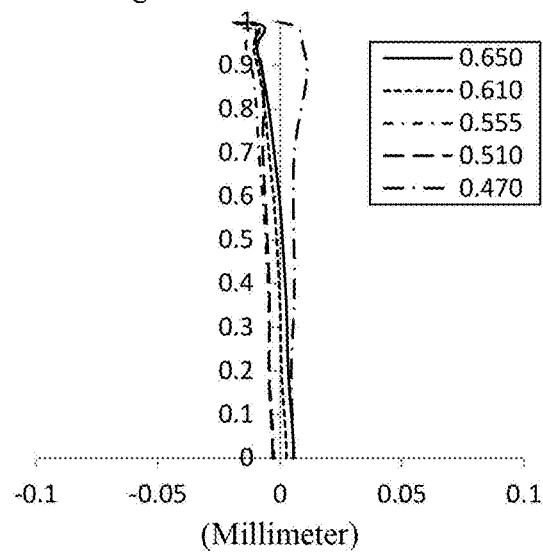
FIGS. 16A to 16D illustrate a longitudinal aberration curve, an astigmatic curve, a distortion curve and a lateral color curve of the optical imaging lens group of the Example 8, respectively.
Figure 16B:
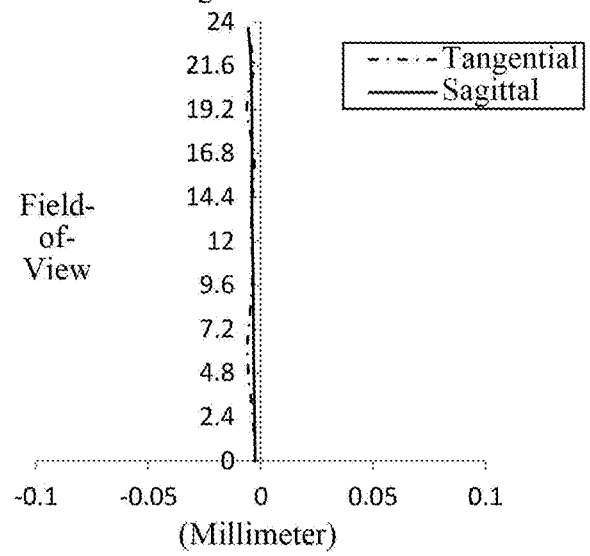
Figure 16C:
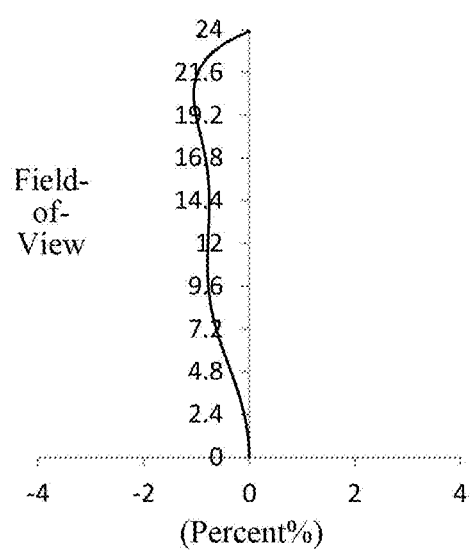
Figure 16D:
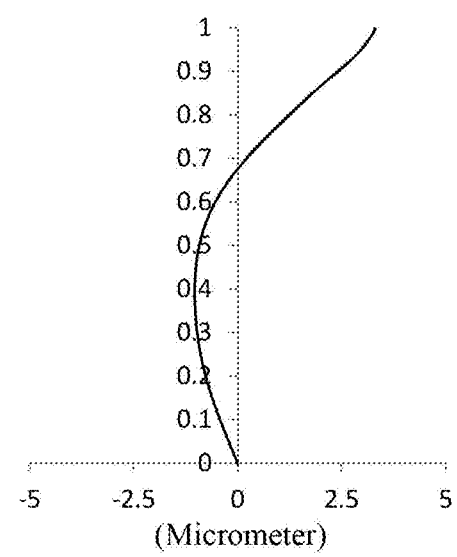

FIG. 16A illustrates a longitudinal aberration curve of the optical imaging lens group according to example 8, representing deviations of focal points converged by light of different wavelengths after passing through the lens assembly. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion at different field-of-views. FIG. 16D illustrates a lateral color curve of the optical imaging lens group according to example 8, representing deviations of different image heights on an imaging plane after light passes through the lens assembly. It can be seen from FIG. 16A to FIG. 16D that the optical imaging lens group provided in example 8 may achieve good image quality.

Example 9

Figure 17:
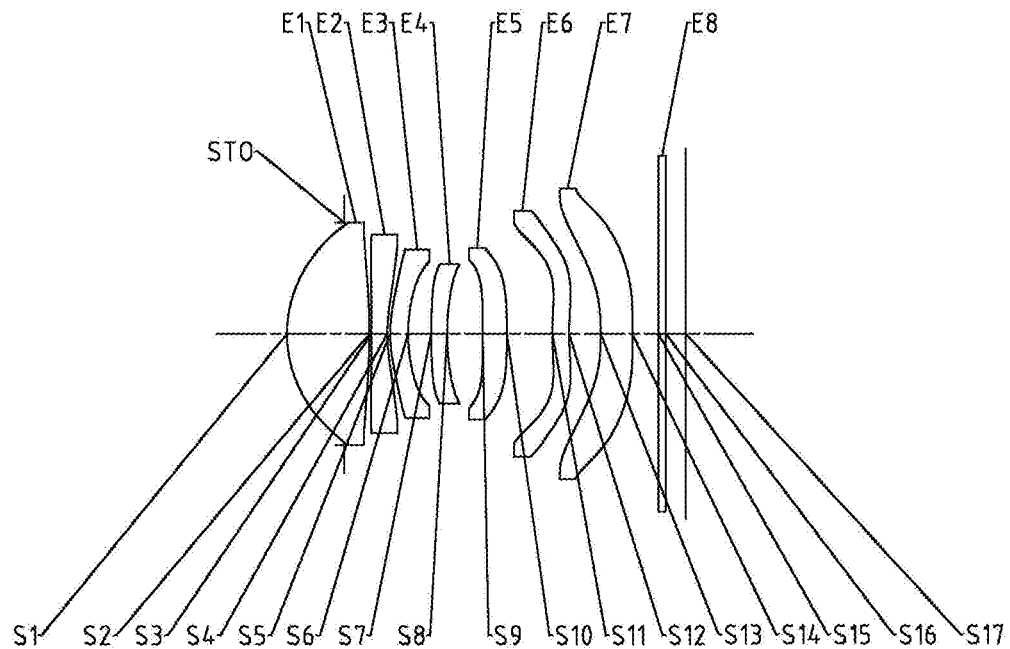
FIG. 17 illustrates a schematic structural view of an optical imaging lens group according to Example 9 of the present disclosure.

An optical imaging lens group according to example 9 of the present disclosure is described below with reference to FIG. 17 to FIG. 18D. FIG. 17 is a schematic structural view of the optical imaging lens group according to example 9 of the present disclosure.

As shown in FIG. 17, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 17 shows a basic parameter table of the optical imaging lens group in example 9, wherein the units for the radius of curvature, the thickness, and the focal length are millimeter (mm). Table 18 shows high-order coefficients applicable to each aspheric surface in example 9, wherein the surface shape of each aspheric surface may be defined by the formula (1) given in the above example 1.

TABLE 17

Example 9: f = 6.24 mm, TTL = 6.00 mm, ImgH = 2.75 mm, Semi-FOV = 23.8°

| | | | | Material | | | |
|---|---|---|---|---|---|---|---|
| Surface number | Surface type | Radius of curvature | Thickness | Refractive index | Abbe number | Focal length | Conic coefficient |
| OBJ | spherical | infinite | infinite | | | | |
| STO | spherical | infinite | −0.8581 | | | | |
| S1 | aspheric | 1.8971 | 1.2407 | 1.55 | 56.1 | 3.07 | −0.0010 |
| S2 | aspheric | −11.0980 | 0.0300 | | | | −2.1746 |
| S3 | aspheric | 54.6785 | 0.2400 | 1.67 | 20.4 | −3.87 | 99.0000 |
| S4 | aspheric | 2.4570 | 0.0428 | | | | 0.0281 |
| S5 | aspheric | 1.9958 | 0.2705 | 1.65 | 23.5 | 12.82 | −0.0366 |
| S6 | aspheric | 2.4931 | 0.3459 | | | | −0.7799 |
| S7 | aspheric | 8.6424 | 0.2400 | 1.55 | 56.1 | −10.87 | −3.1087 |
| S8 | aspheric | 3.4846 | 0.5346 | | | | −0.6260 |
| S9 | aspheric | 41.7658 | 0.3656 | 1.67 | 20.4 | 17.76 | −52.1795 |
| S10 | aspheric | −16.4405 | 0.6852 | | | | 52.2667 |
| S11 | aspheric | 4.3764 | 0.2521 | 1.55 | 56.1 | −80.55 | −92.1294 |
| S12 | aspheric | 3.8994 | 0.4760 | | | | −92.5390 |
| S13 | aspheric | −5.7144 | 0.4759 | 1.54 | 55.9 | −8.25 | 2.5925 |
| S14 | aspheric | 20.2132 | 0.3923 | | | | 45.6807 |
| S15 | spherical | infinite | 0.1100 | 1.52 | 64.2 | | |

TABLE 17-continued

Example 9: f = 6.24 mm, TTL = 6.00 mm, ImgH = 2.75 mm, Semi-FOV = 23.8°

| Surface number | Surface type | Radius of curvature | Thickness | Material Refractive index | Abbe number | Focal length | Conic coefficient |
|---|---|---|---|---|---|---|---|
| S16 | spherical | infinite | 0.2984 | | | | |
| S17 | spherical | infinite | | | | | |

TABLE 18

| Surface number | A4 | A6 | A8 | A10 | A12 |
|---|---|---|---|---|---|
| S1 | −2.3780E−03 | −3.0626E−03 | 6.0259E−03 | −9.9209E−03 | 9.5054E−03 |
| S2 | −2.3665E−02 | 4.6679E−02 | −5.2179E−02 | 5.1971E−02 | −4.0171E−02 |
| S3 | −4.1236E−02 | 6.0842E−02 | −8.7589E−02 | 1.1077E−01 | −9.5365E−02 |
| S4 | −1.6860E−01 | 2.1047E−01 | −4.5099E−01 | 6.6630E−01 | −5.7326E−01 |
| S5 | −1.7877E−01 | 1.7472E−01 | −3.2405E−01 | 3.6709E−01 | −6.4141E−02 |
| S6 | −9.1810E−03 | 3.6278E−02 | −7.2958E−02 | 3.5270E−01 | −7.5869E−01 |
| S7 | −2.3698E−02 | 6.1922E−02 | 6.5386E−02 | −2.1477E−01 | 4.0851E−01 |
| S8 | −4.71139E−02 | 9.7875E−02 | −1.2533E−01 | 3.3497E−01 | −6.6933E−01 |
| S9 | −1.0126E−01 | −6.1613E−02 | 3.6751E−01 | −1.3489E+00 | 2.8807E+00 |
| S10 | −1.0093E−01 | 2.7120E−02 | −1.9397E−02 | −7.4680E−02 | 2.3012E−01 |
| S11 | −1.0676E−01 | −9.0105E−03 | −2.9462E−02 | 4.1701E−02 | −4.5010E−02 |
| S12 | −1.0466E−01 | 7.1102E−03 | 3.5110E−03 | −2.4605E−02 | 2.6694E−02 |
| S13 | −2.6433E−01 | 3.3476E−01 | −2.7596E−01 | 1.5804E−01 | −6.2338E−02 |
| S14 | −2.5439E−01 | 2.5734E−01 | −1.9939E−01 | 1.1334E−01 | −4.5817E−02 |

| Surface number | A14 | A16 | A18 | A20 |
|---|---|---|---|---|
| S1 | −5.7222E−03 | 2.0818E−03 | −4.2233E−04 | 3.6315E−05 |
| S2 | 2.1191E−02 | −7.0573E−03 | 1.3351E−03 | −1.0909E−04 |
| S3 | 5.2914E−02 | −1.8300E−02 | 3.6203E−03 | −3.15586E−04 |
| S4 | 2.8051E−01 | −7.0329E−02 | 5.6586E−03 | 4.7149E−04 |
| S5 | −2.6367E−01 | 2.6877E−01 | −1.0669E−01 | 1.5753E−02 |
| S6 | 1.0875E+00 | −9.9527E−01 | 5.0938E−01 | −1.0861E−01 |
| S7 | −4.6729E−01 | 3.0678E−01 | −1.0297E−01 | 1.3328E−02 |
| S8 | 8.5649E−01 | −6.6608E−01 | 2.8495E−01 | −4.9471E−02 |
| S9 | −3.8153E+00 | 3.0663E+00 | −1.3792E+00 | 2.6678E−01 |
| S10 | −3.0869E−01 | 2.2562E−01 | −8.8416E−02 | 1.4714E−02 |
| S11 | 4.0320E−02 | −2.0429E−02 | 5.1323E−03 | −5.0200E−04 |
| S12 | −1.1268E−02 | 2.1674E−03 | −1.6841E−04 | 1.8728E−06 |
| S13 | 1.6644E−02 | −2.8666E−03 | 2.8659E−04 | −1.2599E−05 |
| S14 | 1.2518E−02 | −2.1764E−03 | 2.1648E−04 | −9.3287E−06 |

Figure 18A:
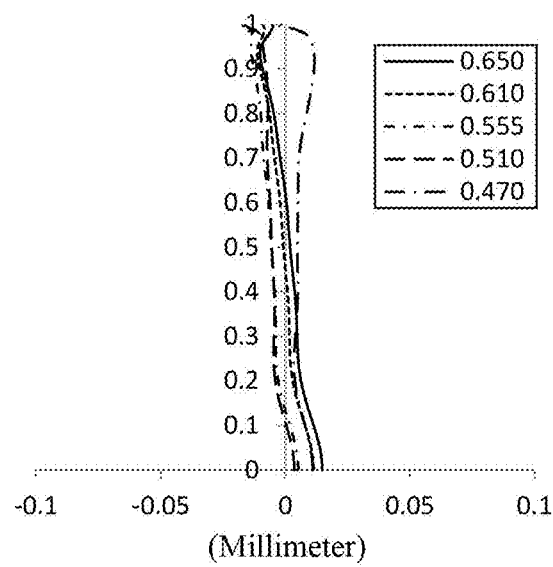
FIGS. 18A to 18D illustrate a longitudinal aberration curve, an astigmatic curve, a distortion curve and a lateral color curve of the optical imaging lens group of the Example 9, respectively.
Figure 18B:
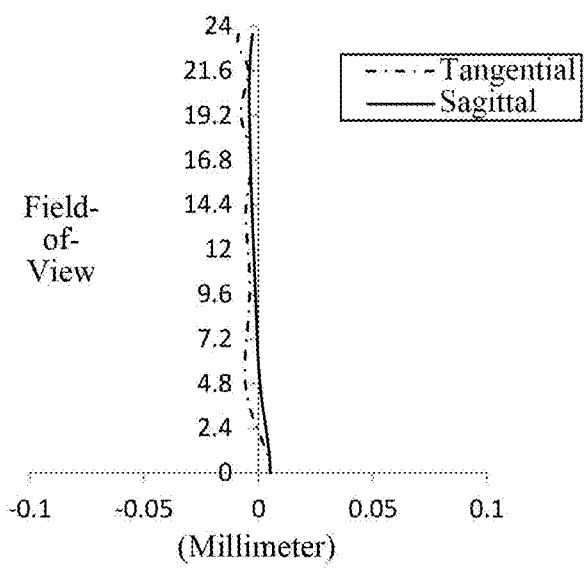
Figure 18C:
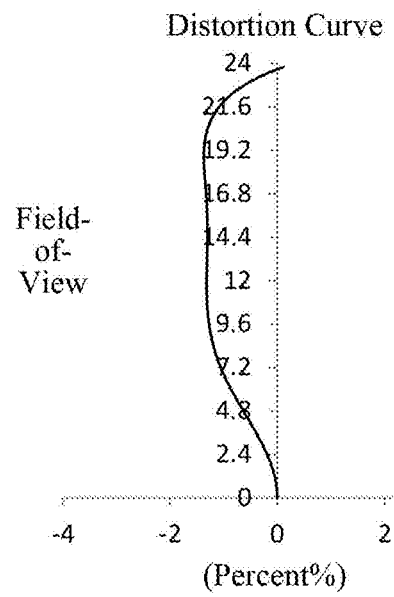
Figure 18D:
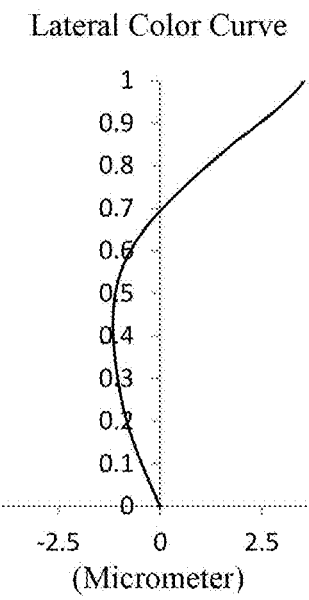

FIG. 18A illustrates a longitudinal aberration curve of the optical imaging lens group according to example 9, representing deviations of focal points converged by light of different wavelengths after passing through the lens assembly. FIG. 18B illustrates an astigmatic curve of the optical imaging lens group according to example 9, representing a curvature of a tangential plane and a curvature of a sagittal plane. FIG. 18C illustrates a distortion curve of the optical imaging lens group according to example 9, representing amounts of distortion at different field-of-views. FIG. 18D illustrates a lateral color curve of the optical imaging lens group according to example 9, representing deviations of different image heights on an imaging plane after light passes through the lens assembly. It can be seen from FIG. 18A to FIG. 18D that the optical imaging lens group provided in example 9 may achieve good image quality.

Example 10

Figure 19:
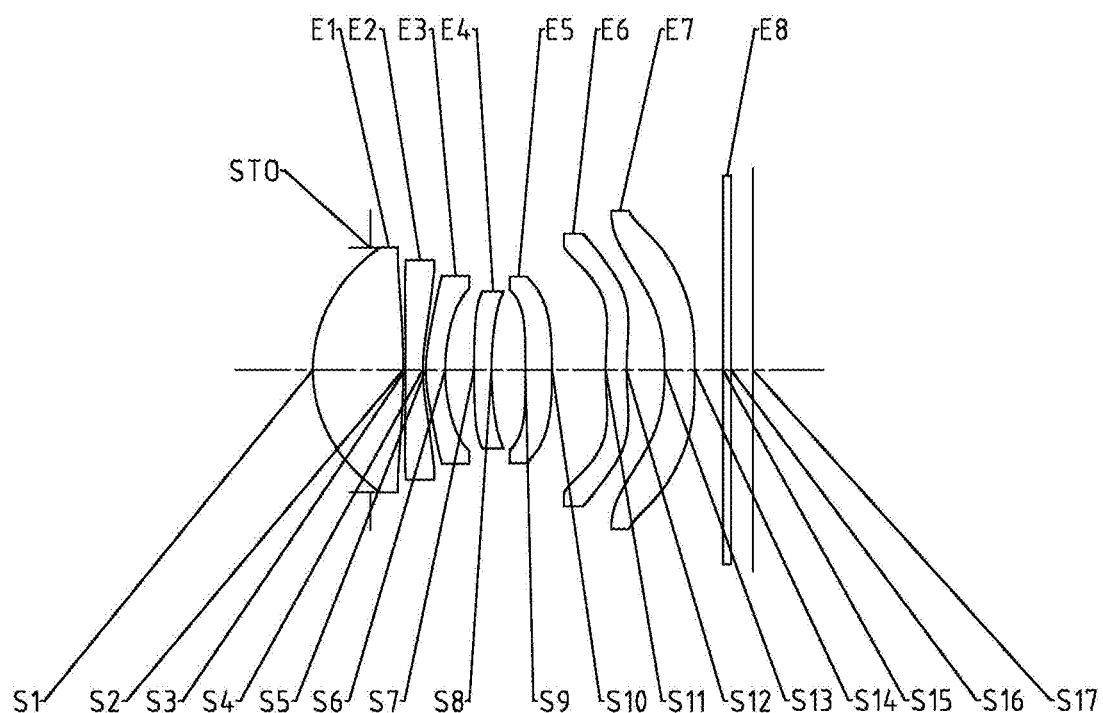
FIG. 19 illustrates a schematic structural view of an optical imaging lens group according to Example 10 of the present disclosure.

An optical imaging lens group according to example 10 of the present disclosure is described below with reference to FIG. 19 to FIG. 20D. FIG. 19 is a schematic structural view of the optical imaging lens group according to example 10 of the present disclosure.

As shown in FIG. 19, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a convex surface. The optical filter E8 has an object-side surface S15 and an image-side surface S16. Light from an object sequentially passes through the respective surfaces S1 to S16 and is finally imaged on the imaging plane S17.

Table 19 shows a basic parameter table of the optical imaging lens group in example 10, wherein the units for the radius of curvature, the thickness, and the focal length are millimeter (mm). Table 20 shows high-order coefficients applicable to each aspheric surface in example 10, wherein the surface shape of each aspheric surface may be defined by the formula (1) given in the above example 1.

TABLE 19

Example 10: f = 6.24 mm, TTL = 6.05 mm, ImgH = 2.75 mm, Semi-FOV = 23.8°

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.7934 | | | | |
| S1 | aspheric | 1.9044 | 1.2435 | 1.55 | 56.1 | 3.11 | 0.0035 |
| S2 | aspheric | −11.9401 | 0.0300 | | | | −1.9887 |
| S3 | aspheric | 48.9039 | 0.2400 | 1.67 | 20.4 | −3.90 | 98.9167 |
| S4 | aspheric | 2.4581 | 0.0403 | | | | 0.0475 |
| S5 | aspheric | 2.0195 | 0.2668 | 1.65 | 23.5 | 13.86 | −0.0506 |
| S6 | aspheric | 2.4758 | 0.3956 | | | | −1.2192 |
| S7 | aspheric | 12.0682 | 0.2400 | 1.55 | 56.1 | −11.77 | −35.9549 |
| S8 | aspheric | 4.1631 | 0.4664 | | | | −1.2942 |
| S9 | aspheric | 4211.8285 | 0.3662 | 1.67 | 20.4 | 16.28 | 99.0000 |
| S10 | aspheric | −10.8628 | 0.7385 | | | | 23.2098 |
| S11 | aspheric | 4.2561 | 0.2863 | 1.55 | 56.1 | −66.00 | −59.5272 |
| S12 | aspheric | 3.7160 | 0.5237 | | | | −54.5328 |
| S13 | aspheric | −4.8102 | 0.4128 | 1.54 | 55.9 | −9.11 | 2.4163 |
| S14 | aspheric | −308.2778 | 0.3920 | | | | −99.0000 |
| S15 | spherical | infinite | 0.1100 | 1.52 | 64.2 | | |
| S16 | spherical | infinite | 0.2980 | | | | |
| S17 | spherical | infinite | | | | | |

TABLE 20

| Surface number | A4 | A6 | A8 | A10 | A12 |
|---|---|---|---|---|---|
| S1 | −2.3677E−03 | −1.7845E−03 | 2.9817E−03 | −5.3096E−03 | 5.2651E−03 |
| S2 | −2.4661E−02 | 4.9004E−02 | −4.6254E−02 | 2.9486E−02 | −1.1066E−02 |
| S3 | −4.3431E−02 | 5.9041E−02 | −5.5971E−02 | 3.3268E−02 | −1.8274E−03 |
| S4 | −1.6523E−01 | 1.7192E−01 | −3.0894E−01 | 3.9086E−01 | −2.4078E−01 |
| S5 | −1.7320E−01 | 1.4220E−01 | −2.4309E−01 | 2.4655E−01 | 6.4523E−02 |
| S6 | −5.5720E−03 | 2.7210E−02 | −7.1613E−02 | 3.2406E−01 | −6.3116E−01 |
| S7 | −2.0489E−02 | 6.1443E−02 | 1.6632E−02 | −7.0741E−02 | 1.6168E−01 |
| S8 | −4.4928E−02 | 8.5623E−02 | −8.9719E−02 | 2.2625E−01 | −4.4363E−01 |
| S9 | −1.0628E−01 | −6.3736E−02 | 4.0580E−01 | −1.5333E+00 | 3.3751E+00 |
| S10 | −9.8761E−02 | 7.4559E−03 | 6.6760E−02 | −2.8147E−01 | 5.4590E−01 |
| S11 | −1.0435E−01 | −3.0981E−02 | 1.2684E−02 | 2.3889E−02 | −5.2632E−02 |
| S12 | −9.1477E−02 | 4.2584E−02 | 5.5983E−02 | 4.4019E−02 | 2.1517E−02 |
| S13 | −2.0548E−01 | 1.9648E−01 | −1.5787E−01 | 1.0588E−01 | −5.0183E−02 |
| S14 | −2.0715E−01 | 1.7760E−01 | −1.3595E−01 | 8.5427E−02 | −3.8632E−02 |

| Surface number | A14 | A16 | A18 | A20 |
|---|---|---|---|---|
| S1 | −3.2698E−03 | 1.2138E−03 | −2.5023E−04 | 2.1653E−05 |
| S2 | 1.1767E−03 | 7.7776E−04 | −3.1811E−04 | 3.7187E−05 |
| S3 | −1.2162E−02 | 8.3525E−03 | −2.3718E−03 | 2.5616E−04 |
| S4 | 2.2683E−02 | 5.3471E−02 | −2.7593E−02 | 4.2772E−03 |
| S5 | −3.6396E−01 | 3.1879E−01 | −1.2002E−01 | 1.7140E−02 |
| S6 | 8.4549E−01 | −7.5801E−01 | 3.8738E−01 | −8.2189E−02 |
| S7 | −1.9045E−01 | 1.0567E−01 | −1.9547E−02 | −1.3092E−03 |
| S8 | 5.7994E−01 | −4.7293E−01 | 2.1186E−01 | −3.8330E−02 |
| S9 | 4.6021E+00 | 3.7980E+00 | −1.7453E+00 | 3.4208E−01 |
| S10 | −6.2045E−01 | 4.1798E−01 | −1.5577E−01 | 2.4902E−02 |
| S11 | 4.8030E−02 | −2.2124E−02 | 5.0721E−03 | 4.6005E−04 |
| S12 | 4.4648E−03 | −1.4620E−04 | 1.8507E−04 | −1.9050E−05 |
| S13 | 1.5648E−02 | −3.0331E−03 | 3.3065E−04 | −1.5485E−05 |
| S14 | 1.1518E−02 | −2.1351E−03 | 2.2307E−04 | −1.0010E−05 |

Figure 20A:
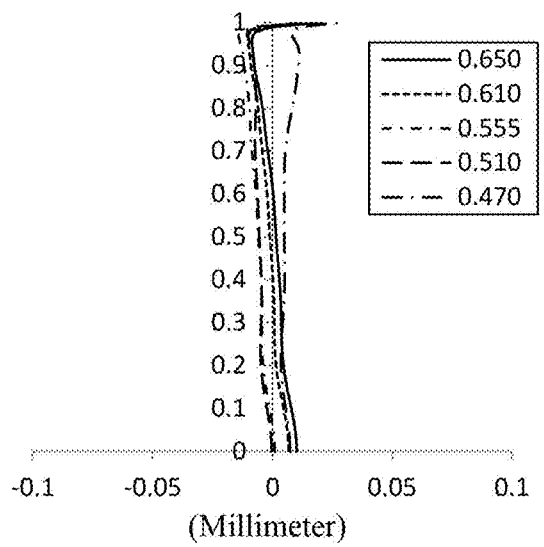
FIGS. 20A to 20D illustrate a longitudinal aberration curve, an astigmatic curve, a distortion curve and a lateral color curve of the optical imaging lens group of the Example 10, respectively.
Figure 20B:
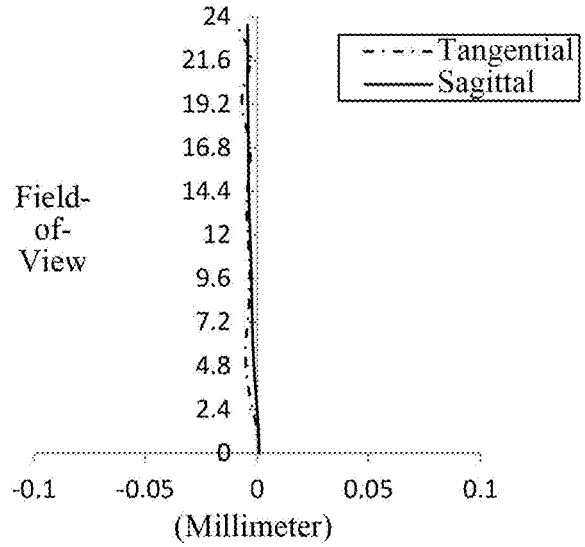
Figure 20C:
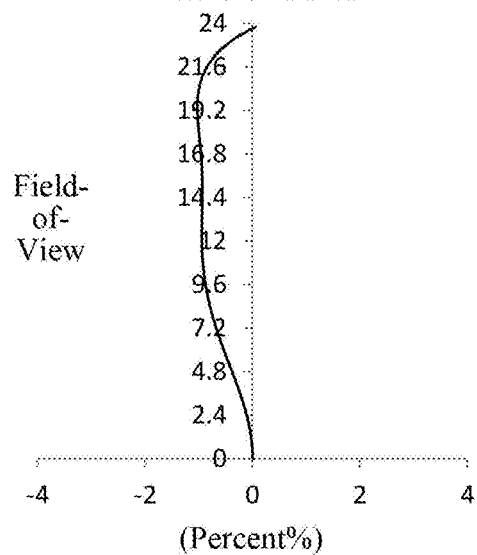
Figure 20D:
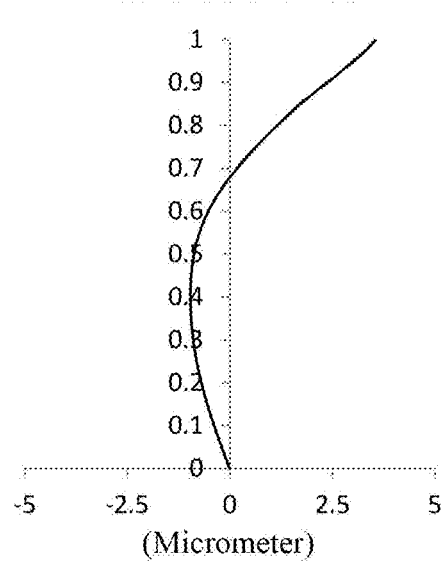

FIG. 20A illustrates a longitudinal aberration curve of the optical imaging lens group according to example 10, representing deviations of focal points converged by light of different wavelengths after passing through the lens assembly. FIG. 20B illustrates an astigmatic curve of the optical imaging lens group according to example 10, representing a curvature of a tangential plane and a curvature of a sagittal plane. FIG. 20C illustrates a distortion curve of the optical imaging lens group according to example 10, representing amounts of distortion at different field-of-views. FIG. 20D illustrates a lateral color curve of the optical imaging lens group according to example 10, representing deviations of different image heights on an imaging plane after light passes through the lens assembly. It can be seen from FIG. 20A to FIG. 20D that the optical imaging lens group provided in example 10 may achieve good image quality.

Example 11

Figure 21:
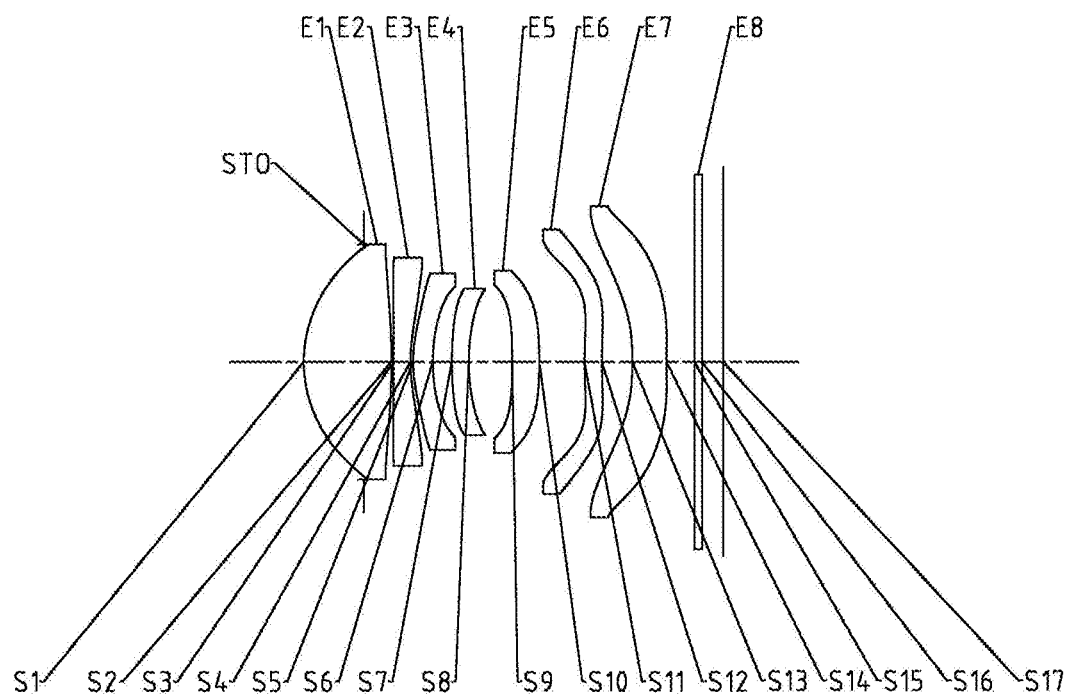
FIG. 21 illustrates a schematic structural view of an optical imaging lens group according to Example 11 of the present disclosure.

An optical imaging lens group according to example 11 of the present disclosure is described below with reference to FIG. 21 to FIG. 22D. FIG. 21 is a schematic structural view of the optical imaging lens group according to example 11 of the present disclosure.

As shown in FIG. 21, the optical imaging lens group includes a stop STO, a first lens E1, a second lens E2, a third lens E3, a fourth lens E4, a fifth lens E5, a sixth lens E6, a seventh lens E7, an optical filter E8 and an imaging plane S17, sequentially from an object side to an image side along an optical axis.

The first lens E1 has a positive refractive power. An object-side surface S1 of the first lens E1 is a convex surface, and an image-side surface S2 of the first lens E1 is a convex surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a concave surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. The seventh lens E7 has a negative refractive power. An object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the respective surfaces S1 to S16 and is finally imaged on the imaging plane S17.

Table 21 shows a basic parameter table of the optical imaging lens group in example 11, wherein the units for the radius of curvature, the thickness, and the focal length are millimeter (mm). Table 22 shows high-order coefficients applicable to each aspheric surface in example 11, wherein the surface shape of each aspheric surface may be defined by the formula (1) given in the above example 1.

TABLE 21

Example 11: f = 6.16 mm, TTL = 5.95 mm, ImgH = 2.75 mm, Semi-FOV = 24.1°

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.8527 | | | | |
| S1 | aspheric | 1.8907 | 1.2441 | 1.55 | 56.1 | 3.06 | −0.0031 |
| S2 | aspheric | −11.1023 | 0.0300 | | | | −2.3936 |
| S3 | aspheric | 46.2405 | 0.2400 | 1.67 | 20.4 | −3.82 | 78.3911 |
| S4 | aspheric | 2.4038 | 0.0378 | | | | 0.0290 |
| S5 | aspheric | 1.9400 | 0.2779 | 1.65 | 23.5 | 11.97 | −0.0280 |
| S6 | aspheric | 2.4477 | 0.2707 | | | | −0.5997 |
| S7 | aspheric | 4.8809 | 0.2400 | 1.55 | 56.1 | −12.38 | 0.0102 |
| S8 | aspheric | 2.7846 | 0.6169 | | | | 0.0671 |
| S9 | aspheric | −12.3605 | 0.3842 | 1.67 | 20.4 | 21.46 | 91.3506 |
| S10 | aspheric | −6.7096 | 0.6426 | | | | 10.5990 |
| S11 | aspheric | 5.7916 | 0.2443 | 1.55 | 56.1 | −53188.54 | −96.5907 |
| S12 | aspheric | 5.7042 | 0.4331 | | | | −83.3649 |
| S13 | aspheric | −6.1450 | 0.4848 | 1.54 | 55.9 | −7.08 | 2.8202 |
| S14 | aspheric | 10.2243 | 0.3937 | | | | 9.0599 |
| S15 | spherical | infinite | 0.1100 | 1.52 | 64.2 | | |
| S16 | spherical | infinite | 0.2998 | | | | |
| S17 | spherical | infinite | | | | | |

TABLE 22

| Surface number | A4 | A6 | A8 | A10 | A12 |
|---|---|---|---|---|---|
| S1 | −2.7104E−03 | −1.6288E−03 | 2.0147E−03 | −3.6564E−03 | 3.5234E−03 |
| S2 | −2.3004E−02 | 4.4819E−02 | −4.9746E−02 | 5.0849E−02 | −4.1033E−02 |
| S3 | −3.8776E−02 | 5.1425E−02 | −7.1224E−02 | 9.6213E−02 | −9.0026E−02 |
| S4 | −1.5709E−01 | 1.2999E−01 | −2.6166E−01 | 4.9820E−01 | −5.9601E−01 |
| S5 | −1.6440E−01 | 9.6414E−02 | −2.1594E−01 | 5.2197E−01 | −6.8113E−01 |
| S6 | −2.3664E−03 | −1.6051E−03 | −8.9747E−04 | 2.9875E−01 | −6.3581E−01 |

TABLE 22-continued

| | | | | | |
|---|---|---|---|---|---|
| S7 | −2.0806E−02 | 2.4457E−02 | 1.6704E−01 | −3.8729E−01 | 7.1856E−01 |
| S8 | −4.0325E−02 | 7.9785E−02 | −1.4749E−01 | 5.9960E−01 | −1.4124E+00 |
| S9 | −9.1790E−02 | −5.3999E−02 | 2.3507E−01 | −8.6856E−01 | 1.9334E+00 |
| S10 | −8.9736E−02 | 1.0166E−02 | −1.8234E−02 | −2.4138E−02 | 1.2888E−01 |
| S11 | −1.0069E−01 | −4.9788E−03 | 5.1962E−02 | −1.9725E−01 | 2.4454E−01 |
| S12 | −1.5489E−01 | 1.7999E−01 | −2.2039E−01 | 1.3069E−01 | −3.4465E−02 |
| S13 | −2.9664E−01 | 4.2416E−01 | −3.5915E−01 | 1.9541E−01 | −6.9770E−02 |
| S14 | −2.8648E−01 | 3.1338E−01 | −2.5277E−01 | 1.4368E−01 | −5.6600E−02 |

| Surface number | A14 | A16 | A18 | A20 |
|---|---|---|---|---|
| S1 | −2.1821E−03 | 8.1359E−04 | −1.7105E−04 | 1.5265E−05 |
| S2 | 2.2597E−02 | −7.8077E−03 | 1.5217E−03 | −1.2746E−04 |
| S3 | 5.3869E−02 | −1.9811E−02 | 4.0935E−03 | −3.6600E−04 |
| S4 | 4.3629E−01 | −1.9022E−01 | 4.5248E−02 | −4.5240E−03 |
| S5 | 4.8351E−01 | −1.7873E−01 | 2.8054E−02 | −5.3862E−04 |
| S6 | 7.2336E−01 | −5.3844E−01 | 2.5768E−01 | −5.7288E−02 |
| S7 | −9.2375E−01 | 7.1567E−01 | −2.9383E−01 | 4.9010E−02 |
| S8 | 2.0088E+00 | −1.7219E+00 | 8.1930E−01 | −1.6355E−01 |
| S9 | −2.6994E+00 | 2.2953E+00 | −1.0978E+00 | 2.2674E−01 |
| S10 | −2.0468E−01 | 1.6432E−01 | −6.8934E−02 | 1.2145E−02 |
| S11 | −1.4879E−01 | 4.9206E−02 | −8.4720E−03 | 5.9440E−04 |
| S12 | 1.1360E−03 | 1.5032E−03 | −3.3312E−04 | 2.2900E−05 |
| S13 | 1.6430E−02 | −2.4814E−03 | 2.1979E−04 | −8.7366E−06 |
| S14 | 1.4884E−02 | −2.4728E−03 | 2.3371E−04 | −9.5323E−06 |

Figure 22A:
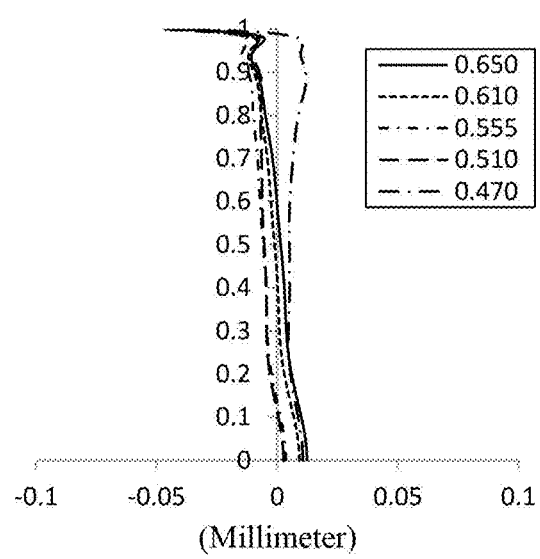
FIGS. 22A to 22D illustrate a longitudinal aberration curve, an astigmatic curve, a distortion curve and a lateral color curve of the optical imaging lens group of the Example 11, respectively.
Figure 22B:
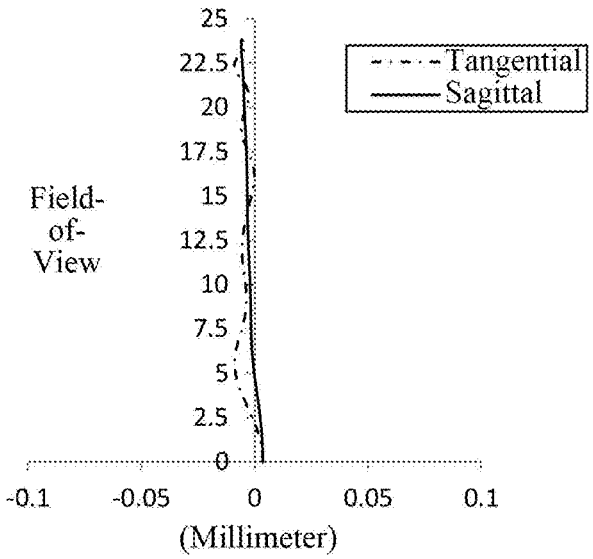
Figures 22C, 22D:
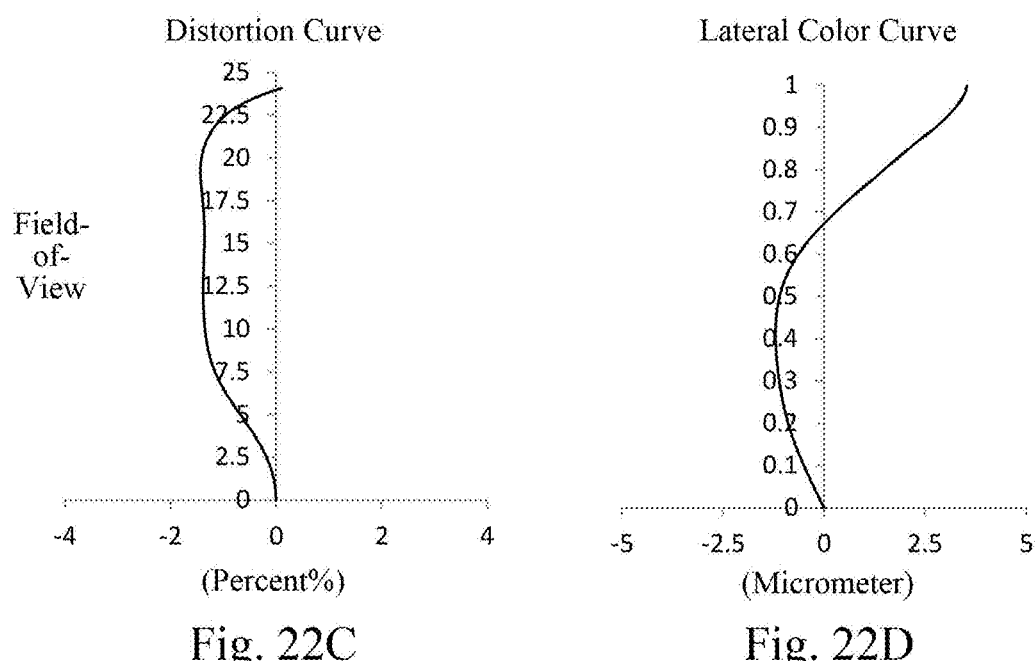

FIG. 22A illustrates a longitudinal aberration curve of the optical imaging lens group according to example 11, representing deviations of focal points converged by light of different wavelengths after passing through the lens assembly. FIG. 22B illustrates an astigmatic curve of the optical imaging lens group according to example 11, representing a curvature of a tangential plane and a curvature of a sagittal plane. FIG. 22C illustrates a distortion curve of the optical imaging lens group according to example 11, representing amounts of distortion at different field-of-views. FIG. 22D illustrates a lateral color curve of the optical imaging lens group according to example 11, representing deviations of different image heights on an imaging plane after light passes through the lens assembly. It can be seen from FIG. 22A to FIG. 22D that the optical imaging lens group provided in example 11 may achieve good image quality.

In view of the above, examples 1 to 11 respectively satisfy the relationship shown in Table 23.

The present disclosure further provides an imaging device, having a photosensitive element which may be a photosensitive Charge-Coupled Device (CCD) or a Complementary Metal-Oxide Semiconductor (CMOS). The imaging device may be an independent imaging device such as a digital camera, or may be an imaging module integrated in a mobile electronic device such as a mobile phone. The imaging device is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

TABLE 23

| | Example | | | | | | | | | | |
|---|---|---|---|---|---|---|---|---|---|---|---|
| Condition | 1 | 2 | 3 | 4 | 5 | 6 | 7 | 8 | 9 | 10 | 11 |
| TTL/f | 0.95 | 0.95 | 0.95 | 0.95 | 0.95 | 0.95 | 0.95 | 0.98 | 0.96 | 0.97 | 0.97 |
| f/EPD | 1.86 | 1.86 | 1.87 | 1.87 | 1.87 | 1.87 | 1.87 | 1.86 | 1.86 | 1.86 | 1.84 |
| f1/f | 0.49 | 0.49 | 0.49 | 0.49 | 0.49 | 0.55 | 0.55 | 0.50 | 0.49 | 0.50 | 0.50 |
| f2/f7 | 0.55 | 0.56 | 0.53 | 0.51 | 0.67 | 0.60 | 0.55 | 0.47 | 0.47 | 0.43 | 0.54 |
| f1234/f | 0.97 | 0.98 | 1.02 | 1.02 | 1.02 | 0.98 | 0.90 | 1.00 | 1.03 | 1.06 | 0.98 |
| f/f67 | −0.91 | −0.91 | −0.93 | −0.90 | −0.99 | −0.99 | −0.81 | −0.75 | −0.82 | −0.77 | −0.86 |
| R1/R4 | 0.80 | 0.74 | 0.72 | 0.71 | 0.58 | 0.84 | 0.85 | 0.78 | 0.77 | 0.77 | 0.79 |
| R5/R6 | 0.78 | 0.79 | 0.79 | 0.79 | 1.09 | 0.86 | 0.87 | 0.81 | 0.80 | 0.82 | 0.79 |
| R6/R7 | 0.57 | 0.41 | 0.19 | 0.19 | 0.26 | 0.58 | 0.63 | 0.35 | 0.29 | 0.21 | 0.50 |
| R8/f | 0.40 | 0.50 | 0.68 | 0.69 | 0.72 | 0.51 | 0.56 | 0.56 | 0.56 | 0.67 | 0.45 |
| f/R10 | −0.89 | −0.94 | −0.54 | −0.52 | −0.61 | −0.55 | −0.10 | −0.94 | −0.38 | −0.57 | −0.92 |
| R12/R11 | 1.00 | 0.95 | 0.89 | 0.88 | 0.82 | 0.86 | 0.96 | 0.96 | 0.89 | 0.87 | 0.98 |
| R13/f7 | 0.96 | 0.73 | 0.64 | 0.54 | 0.57 | 0.63 | 0.61 | 0.70 | 0.69 | 0.53 | 0.87 |
| (CT2 + CT5)/CT1 | 0.50 | 0.49 | 0.48 | 0.48 | 0.49 | 0.50 | 0.50 | 0.52 | 0.49 | 0.49 | 0.50 |
| (CT3 + CT4)/(T34 + T45) | 0.58 | 0.58 | 0.61 | 0.61 | 0.56 | 0.55 | 0.59 | 0.59 | 0.58 | 0.59 | 0.58 |
| (CT6 + CT7)/(T56 + T67) | 0.74 | 0.59 | 0.54 | 0.54 | 0.50 | 0.56 | 0.76 | 0.75 | 0.63 | 0.55 | 0.68 |
| SAG61/SAG72 | 0.70 | 0.69 | 0.66 | 0.64 | 0.67 | 0.64 | 0.62 | 0.70 | 0.68 | 0.63 | 0.71 |

What is claimed is:

1. An optical imaging lens group, sequentially from an object side of the optical imaging lens group to an image side of the optical imaging lens group along an optical axis of the optical imaging lens group, comprising:
    a first lens having a positive refractive power;
    a second lens having a negative refractive power;
    a third lens having a refractive power;
    a fourth lens having a refractive power, and an image-side surface of the fourth lens being a concave surface;
    a fifth lens having a refractive power;
    a sixth lens having a refractive power, and an object-side surface of the sixth lens being a convex surface;
    a seventh lens having a negative refractive power; and
    wherein TTL/f<1, where TTL is a distance along the optical axis from an object-side surface of the first lens of the optical imaging lens group to an imaging plane of the optical imaging lens group, and f is a total effective focal length of the optical imaging lens group, and
    wherein 0.3<(CT3+CT4)/(T34+T45)<0.8,
    where CT3 is a center thickness of the third lens along the optical axis, CT4 is a center thickness of the fourth lens along the optical axis, T34 is an air interval between the third lens and the fourth lens along the optical axis and T45 is an air interval between the fourth lens and the fifth lens along the optical axis.

2. The optical imaging lens group according to claim 1, wherein 0.3<f1/f<0.8,
    where f is the total effective focal length of the optical imaging lens group, and f1 is an effective focal length of the first lens.

3. The optical imaging lens group according to claim 1, wherein 0.3<f2/f7<0.8,
    where f2 is an effective focal length of the second lens, and f7 is an effective focal length of the seventh lens.

4. The optical imaging lens group according to claim 1, wherein 0.7<f1234/f<1.2,
    where f1234 is a combined focal length of the first lens, the second lens, the third lens, and the fourth lens, and f is the total effective focal length of the optical imaging lens group.

5. The optical imaging lens group according to claim 1, wherein −1<f/f67<−0.5,
    where f is the total effective focal length of the optical imaging lens group, and f67 is a combined focal length of the sixth lens and the seventh lens.

6. The optical imaging lens group according to claim 1, wherein 0.3<(CT2+CT5)/CT1<0.8,
    where CT1 is a center thickness of the first lens along the optical axis, CT2 is a center thickness of the second lens along the optical axis, and CT5 is a center thickness of the fifth lens along the optical axis.

7. The optical imaging lens group according to claim 1, wherein 0.4<(CT6+CT7)/(T56+T67)<0.9,
    where CT6 is a center thickness of the sixth lens along the optical axis, CT7 is a center thickness of the seventh lens along the optical axis, T56 is an air interval between the fifth lens and the sixth lens along the optical axis, and T67 is an air interval between the sixth lens and the seventh lens along the optical axis.

8. The optical imaging lens group according to claim 1, wherein 0.5<SAG61/SAG72<1,
    where SAG61 is a distance along the optical axis from an intersection of the object-side surface of the sixth lens and the optical axis to an apex of an effective radius of the object-side surface of the sixth lens, and SAG72 is a distance along the optical axis from an intersection of an image-side surface of the seventh lens and the optical axis to an apex of an effective radius of the image-side surface of the seventh lens.

9. An optical imaging lens group, sequentially from an object side of the optical imaging lens group to an image side of the optical imaging lens group along an optical axis of the optical imaging lens group, comprising:
    a first lens having a positive refractive power;
    a second lens having a negative refractive power;
    a third lens having a refractive power;
    a fourth lens having a refractive power, and object-side surface of the fourth lens being a convex surface;
    a fifth lens having a refractive power;
    a sixth lens having a refractive power, and an image-side surface of the sixth lens being a concave surface;
    a seventh lens having a negative refractive power;
    wherein TTL/f<1 and f/EPD <2,
    where TTL is a distance along the optical axis from an object-side surface of the first lens of the optical imaging lens group to an imaging plane of the optical imaging lens group, f is a total effective focal length of the optical imaging lens group, and EPD is an entrance pupil diameter of the optical imaging lens group, and
    wherein 0.3<(CT3+CT4)/(T34+T45)<0.8,
    where CT3 is a center thickness of the third lens along the optical axis, CT4 is a center thickness of the fourth lens along the optical axis, T34 is an air interval between the third lens and the fourth lens along the optical axis, and T45 is an air interval between the fourth lens and the fifth lens along the optical axis.

10. The optical imaging lens group according to claim 9, wherein 0.5<R1/R4<1,
    where R1 is a radius of curvature of the object-side surface of the first lens, and R4 is a radius of curvature of an image-side surface of the second lens.

11. The optical imaging lens group according to claim 9, wherein 0.7<R5/R6<1.2,
    where R5 is a radius of curvature of an object-side surface of the third lens, and R6 is a radius of curvature of an image-side surface of the third lens.

12. The optical imaging lens group according to claim 9, wherein 0.1<R6/R7<0.7,
    where R6 is a radius of curvature of an image-side surface of the third lens, and R7 is a radius of curvature of the object-side surface of the fourth lens.

13. The optical imaging lens group according to claim 9, wherein 0.3<R8/f <0.8,
    where R8 is a radius of curvature of an image-side surface of the fourth lens, and f is the total effective focal length of the optical imaging lens group.

14. The optical imaging lens group according to claim 9, wherein −1<f/R10 <0,
    where R10 is a radius of curvature of an image-side surface of the fifth lens, and f is the total effective focal length of the optical imaging lens group.

15. The optical imaging lens group according to claim 9, wherein 0.7<R12/R11<1.2,
    where R11 is a radius of curvature of an object-side surface of the sixth lens, and R12 is a radius of curvature of the image-side surface of the sixth lens.

16. The optical imaging lens group according to claim 9, wherein 0.5<R13/f7<1,
    where R13 is a radius of curvature of an object-side surface of the seventh lens, and f7 is an effective focal length of the seventh lens.

17. The optical imaging lens group according to claim 9, wherein $0.3<(CT2+CT5)/CT1<0.8$,
- where CT1 is a center thickness of the first lens along the optical axis, CT2 is a center thickness of the second lens along the optical axis, and CT5 is a center thickness of the fifth lens along the optical axis.

18. The optical imaging lens group according to claim 9, wherein $0.4<(CT6+CT7)/(T56+T67)<0.9$,
- where CT6 is a center thickness of the sixth lens along the optical axis, CT7 is a center thickness of the seventh lens along the optical axis, T56 is an air interval between the fifth lens and the sixth lens along the optical axis, and T67 is an air interval between the sixth lens and the seventh lens along the optical axis.

* * * * *